United States Patent
Moriya et al.

(10) Patent No.: US 10,264,192 B2
(45) Date of Patent: Apr. 16, 2019

(54) VIDEO PROCESSING DEVICE

(71) Applicant: Sharp Kabushiki Kaisha, Sakai, Osaka (JP)

(72) Inventors: Masaaki Moriya, Sakai (JP); Katsuya Otoi, Sakai (JP); Takayuki Murai, Sakai (JP); Yoshimitsu Murahashi, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 15/544,687

(22) PCT Filed: Jan. 15, 2016

(86) PCT No.: PCT/JP2016/051164
§ 371 (c)(1),
(2) Date: Jul. 19, 2017

(87) PCT Pub. No.: WO2016/117475
PCT Pub. Date: Jul. 28, 2016

(65) Prior Publication Data
US 2017/0353671 A1    Dec. 7, 2017

(30) Foreign Application Priority Data

Jan. 19, 2015  (JP) .................. 2015-007583

(51) Int. Cl.
*H04N 5/262* (2006.01)
*G06T 1/20* (2006.01)
*G06K 9/00* (2006.01)
*H04N 5/225* (2006.01)
*H04N 5/14* (2006.01)
*H04N 5/232* (2006.01)

(52) U.S. Cl.
CPC ......... *H04N 5/262* (2013.01); *G06K 9/00221* (2013.01); *G06T 1/20* (2013.01); *H04N 5/14* (2013.01); *H04N 5/225* (2013.01); *H04N 5/23219* (2013.01)

(58) Field of Classification Search
CPC .......... H04N 5/262; H04N 5/225; H04N 5/14; G06K 9/00281; G06K 9/00268
See application file for complete search history.

(56) References Cited

U.S. PATENT DOCUMENTS

| | | | |
|---|---|---|---|
| 2002/0191818 A1* | 12/2002 | Matsuo | G06K 9/00228 382/118 |
| 2007/0030375 A1 | 2/2007 | Ogasawara et al. | |
| 2012/0200729 A1* | 8/2012 | Hoda | H04N 5/23219 348/222.1 |

FOREIGN PATENT DOCUMENTS

| | | |
|---|---|---|
| JP | 2007-068147 A | 3/2007 |
| JP | 2012-165174 A | 8/2012 |
| JP | 2013-131077 A | 7/2013 |

* cited by examiner

*Primary Examiner* — Ahmed A Berhan
(74) *Attorney, Agent, or Firm* — ScienBiziP, P.C.

(57) ABSTRACT

A video processing device detects, as a characteristic region, a region having a prescribed characteristic in each frame of a video and performs specific image processing on either the characteristic region in the frame or a region other than the characteristic region in the frame with a specified processing strength. The processing strength is specified so as to be altered stepwise in at least two steps that involve an intermediate value between a minimum value and a maximum value when there is a change in whether or not a characteristic region has been detected.

20 Claims, 14 Drawing Sheets

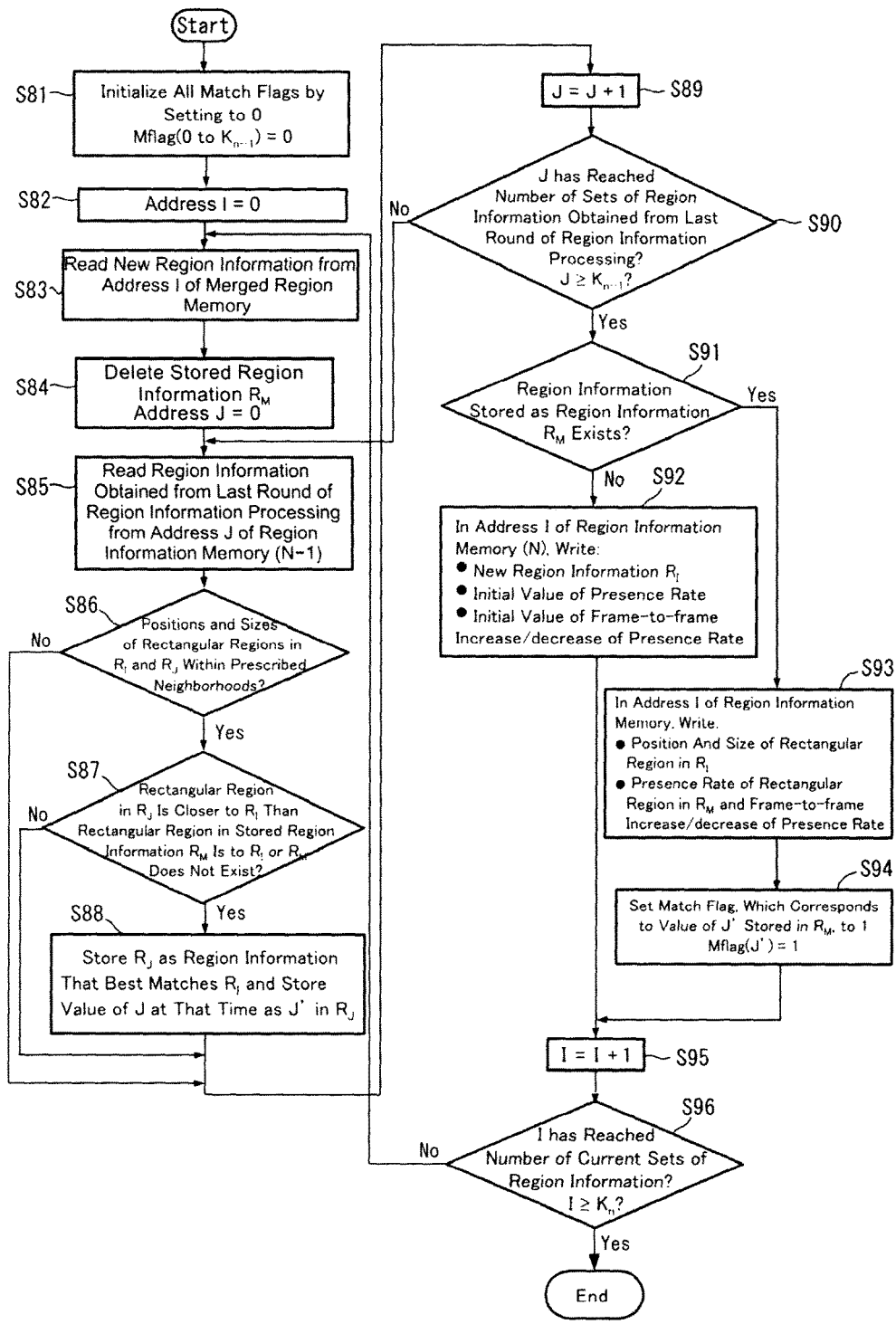

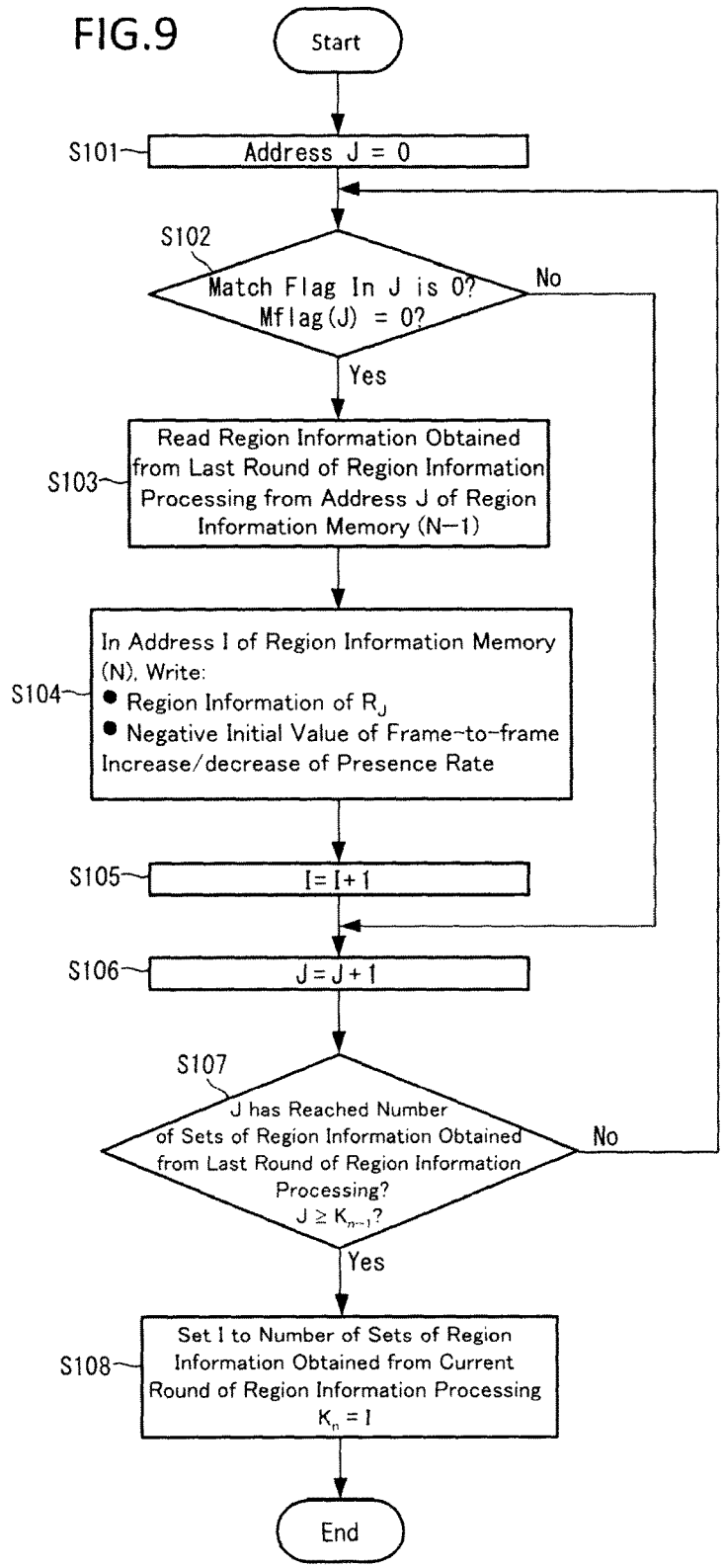

VIDEO PROCESSING DEVICE

TECHNICAL FIELD

The present invention relates to video processing devices.

BACKGROUND ART

Patent Literature 1 discloses an image processing device that detects a face in image data and performs a first painterly conversion process on a predetermined region corresponding to the detected face and a second painterly conversion process, which differs from the first painterly conversion process, on regions other than the predetermined region. The image processing device hence subjects face portions in the image to a painterly conversion suitable for the face and non-face portions to a painterly conversion suitable for the background, so as to realize a natural painterly conversion as a whole

CITATION LIST

Patent Literature

Patent Literature 1: Japanese Unexamined Patent Application Publication, Tokukai, No. 2013-131077

SUMMARY OF INVENTION

Technical Problem

The image processing device disclosed in Patent Literature 1, when used to process a moving image, performs a painterly conversion process that differs from a painterly conversion process that should be performed, for example, if the image processing device fails to detect a face in sonic of consecutive frames or if the image processing device wrongly detects a non-face portion as a face. That could in turn result in a processed moving image in Which the face portions (and other portions) appear as if flickering.

The present invention has an object to provide technology that, in detecting a characteristic region having a prescribed characteristic in each frame of a video and performing specific image processing on either the detected characteristic region or regions other than the characteristic region, suppresses changes to be made to the image if the characteristic region fails to be detected or is wrongly detected.

Solution to Problem

The present invention, in one embodiment, is directed to a video processing device including: a characteristic region detection unit configured to detect, as a characteristic region, a region having a prescribed characteristic in each frame of a video; an image processing unit configured to perform specific image processing on either the characteristic region in the frame or a region other than the characteristic region in the frame; and a processing strength specification unit configured to specify a processing strength with which the specific image processing is performed, the processing strength specification unit altering the processing strength stepwise in at least two steps that involve an intermediate value between a minimum value and a maximum value when there is a change in whether or not the characteristic region detection unit has detected the characteristic region.

Advantageous Effects of Invention

According to the disclosure of the present application, the processing strength with which the specific image processing is performed is altered stepwise in at least two steps when there is a change in whether or not a characteristic region has been detected. Changes to be made to the image are attenuated if the characteristic region fails to be detected or is wrongly detected.

BRIEF DESCRIPTION OF DRAWINGS

FIG. 8 is a flow chart depicting specific details of process 2 performed in step S62 shown in FIG. 6 by a video processing device in accordance with a second embodiment.

FIG. 9 is a flow chart depicting specific details of process 3 performed in step S63 shown in FIG. 6 by a video processing device in accordance with a third embodiment.

DESCRIPTION OF EMBODIMENTS

Figure 1:
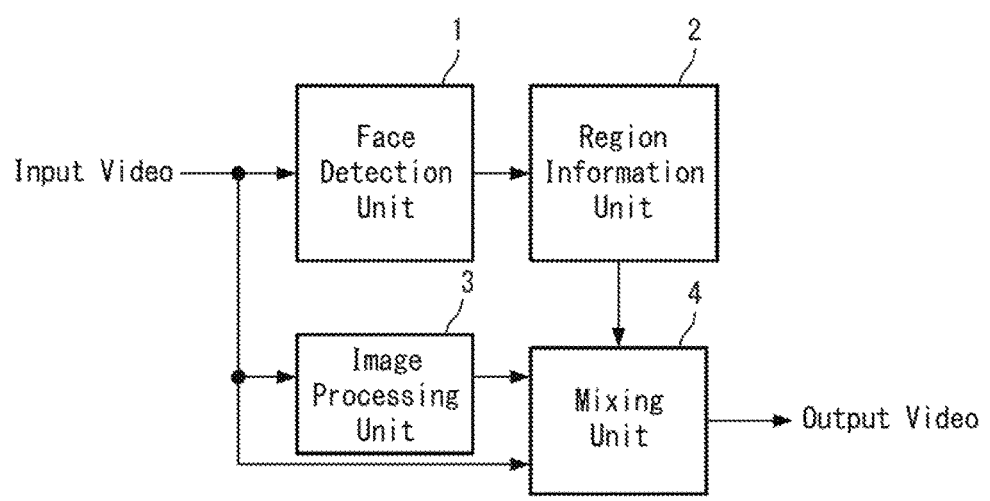
FIG. 1 is a block diagram of an overall configuration of a video processing device in accordance with a first embodiment.

A video processing device in accordance with an embodiment of the present invention includes: a characteristic region detection unit configured to detect, as a characteristic region, a region having a prescribed characteristic in each frame of a video; an image processing unit configured to perform specific image processing on either the characteristic region in the frame or a region other than the characteristic region in the frame; and a processing strength specification unit configured to specify a processing strength with which the specific image processing is performed, the processing strength specification unit altering the processing strength stepwise in at least two steps that involve an intermediate value between a minimum value and a maximum value when there is a change in whether or not the characteristic region detection unit has detected the characteristic region (first feature).

According to the first feature, the processing strength with which the specific image processing is performed neither abruptly changes from a minimum value to a maximum value nor abruptly changes from the maximum value to the minimum value even if the characteristic region fails to be detected or is wrongly detected. Changes to be made to the image due to a failed or wrong detection of the characteristic region are hence attenuated. This technique suppresses degradation of video image quality and alleviates the sense of strangeness that the user might have when watching the video.

In the first feature, the video processing device may further include a determination unit configured to determine a probability of the characteristic region having the prescribed characteristic, wherein the processing strength specification unit specifies the processing strength in accordance with the probability of the characteristic region having the prescribed characteristic (second feature).

According to the second feature, the specific image processing can be performed with a suitable processing strength in accordance with the probability of the characteristic region having a prescribed characteristic. Therefore, the image quality can be further improved.

In the second feature, the processing strength specification unit may increase the maximum value of the processing strength with an increase in the probability of the characteristic region having the prescribed characteristic (third feature). According to the third feature, the specific image processing can he performed with a processing strength in accordance with the probability of the characteristic region having a prescribed characteristic. Therefore, a higher quality video can be produced.

In the second or third feature, the processing strength specification unit, in altering the processing strength stepwise, may increase an initial value with an increase in the probability of the characteristic region having the prescribed characteristic (fourth feature). According to the fourth feature, the higher the probability of the characteristic region having the prescribed characteristic, the more quickly the processing strength with which the specific image processing is performed can reach the maximum value. Therefore, a higher quality video can be produced.

In any one of the second to fourth features, the processing strength specification unit may alter the processing strength stepwise by a per-step amount that increases with an increase in the probability of the characteristic region having the prescribed characteristic (fifth feature). According to the fifth feature, the higher the probability of the characteristic region having the prescribed characteristic, the more quickly the processing strength with which the specific image processing is performed can reach the maximum value. Therefore, a higher quality video can be produced.

In any one of the first to fifth features, the video processing device may further include a detection counting unit configured to count a number of times that the characteristic region detection unit consecutively detects an identical characteristic region, wherein the processing strength specification unit does not change the processing strength if the number of times that the identical characteristic region is consecutively detected is less than a predetermined value (sixth feature). According to the sixth feature, even when a non-characteristic region is wrongly detected as a characteristic region, the processing strength is not altered if the number of consecutive wrong detections is less than a predetermined value. Hence, wrong detection does not cause any changes to image quality.

Embodiments

The following will describe embodiments of the present invention detail in reference to drawings, identical or equivalent members will be denoted by the same reference signs in the drawings, and description thereof is not repeated. For clarity purposes, the drawings to which reference will he made in the following description may show structures in a simplified or schematic form or omit some structural members.

First to third embodiments below will describe examples in which a human face region is detected in frames of a video as a characteristic region having a prescribed characteristic and subjected to specific image processing. It should be understood that characteristic regions are by no means limited to human face regions and may be any region with a common shape characteristic provided that pattern information for that region is prepared in advance. Examples of a characteristic region include facial parts such as an eye, ear, nose, and mouth. Other feasible examples include a smiling face and like specific facial expression, as well as human upper, lower, and entire bodies. As an example, an entire human body may be detected as a characteristic region that is subjected to blurring (specific image processing), in order to convert a video captured on a monitoring camera to a video in which privacy concerns are heeded. Additionally, a human eye may be detected as a characteristic region that is subjected to a process that slightly increases the size of the eye (specific image processing). A characteristic region may be detected so as to subject a region other than the characteristic region to specific image processing.

First Embodiment

FIG. 1 is a block diagram of an overall configuration of a video processing device in accordance with the first embodiment. The video processing device in accordance with the first embodiment includes a face detection unit 1, a region information unit 2, an image processing unit 3, and a mixing unit 4. The video processing device may further include a preliminary processing unit (detailed later) and/or another processing unit.

A video is fed to the face detection unit 1, the image processing unit 3, and the mixing unit 4. If the video processing device includes a preliminary processing unit (detailed later), the video is fed to the preliminary processing unit, instead of the face detection unit 1.

The face detection unit 1 detects regions in which a human face is present by performing pattern determination (detailed later) on each frame of the video. The pattern determination by which a face is detected may be, for example, the Viola-Jones method, the use of which is assumed in this specification. The Viola-Jones method is however by no means the only possible face detection method. There are other methods available for use, including SIFT and SURF.

The region information unit 2 controls region information for a face that is present in each frame of the video. The region information includes, for examples, the position and size of the face region detected by the face detection unit 1, the presence rate of a face, and an increase or decrease of the face presence rate from one frame to the next.

The image processing unit 3 performs specific image processing on each frame of the video. Since the present embodiment is intended to produce a video in which human faces in each frame of the video are processed by specific image processing, the specific image processing is preferably performed on human faces. The specific image processing may be, for example, profile enhancement, smoothing, noise removal, luminance adjustment, or color adjustment.

The mixing unit 4 calculates processing strengths for the specific image processing from the region information managed by the region information unit 2 and combines the video signal subjected to the image processing in the image processing unit 3 with an input video signal in accordance with the calculated processing strengths, to generate an output video signal. In this manner, an output video can be generated in which the face region in each frame is subjected to specific image processing that is suited for the face.

Figure 2:
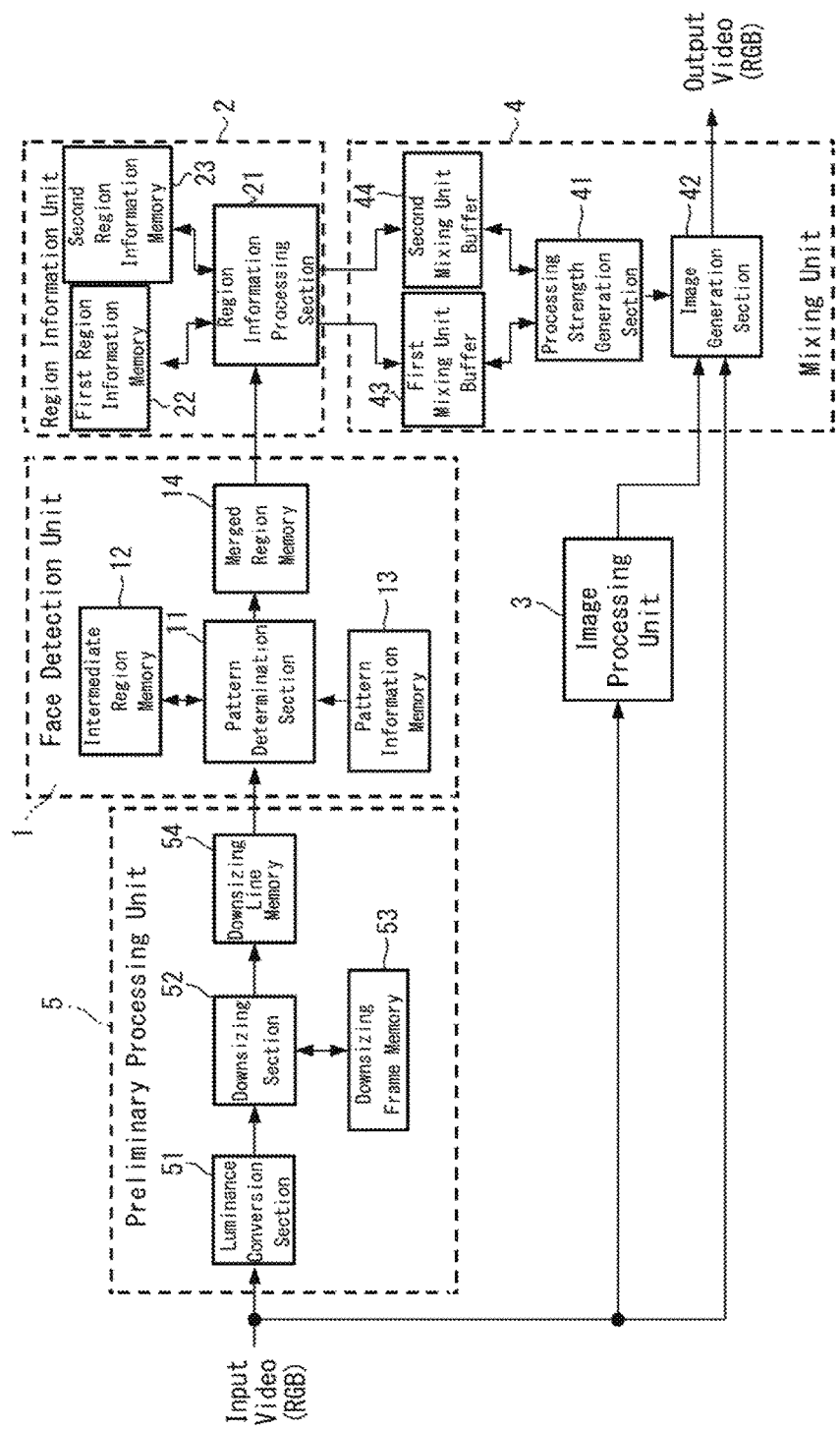
FIG. 2 is a block diagram of a configuration of a face detection unit, a region information unit, and a mixing unit in detail.

FIG. 2 is a block diagram of a specific configuration of the face detection unit 1, the region information unit 2, and the mixing unit 4. FIG. 2 shows a preliminary processing unit 5, which is omitted in FIG. 1. The video processing device in accordance with the present embodiment may or may not include the preliminary processing unit 5.

The preliminary processing unit 5 includes a luminance conversion section 51, a downsizing section 52, a downsizing line memory 53, and a downsizing frame memory 54.

The video is fed to the luminance conversion section 51 in the preliminary processing unit 5, as well as to the image processing unit 3 and the mixing unit 4. The video signal fed to the luminance conversion section 51 is an RGB signal composed of R (red), G (green), and B (blue) color signals. The luminance conversion section 51 converts an incoming video signal to luminance data.

The downsizing section 52 performs predetermined filtering on the luminance data to shed data covering some rows and columns of pixels, thereby generating downsized luminance data covering fewer rows and columns of pixels than the input video.

In shedding data covering some columns of pixels for downsizing, the downsizing section 52 stores luminance data for a plurality of lines in the downsizing line memory 53. The downsizing section 52 then retrieves, from the downsizing line memory 53, luminance data for the same number of lines as the number of taps in the filter used for column downsizing and. subjects the retrieved luminance data to the filtering for column downsizing.

The downsized luminance data is stored in the downsizing frame memory 54. After storing downsized luminance data for one frame in the downsizing frame memory 54, the downsizing section 52 temporarily suspends writing to the downsizing frame memory 54.

The face detection unit 1 includes a pattern determination section 11, an intermediate region memory 12, a pattern information memory 13, and an merged region memory 14. The processes performed by the face detection unit 1 will be described later in detail.

The region information unit 2 includes a region information processing section 21, a first region information memory 22, and a second region information memory 23. The processes performed by the region information unit 2 will be described later in detail.

The mixing unit 4 includes a processing strength generation section 41, an image generation section 42, a first mixing unit buffer 43, and a second mixing unit huffer 44. The processes performed by the mixing unit 4 will be described later in detail.

Now, the processes performed by the face detection unit 1 will be described in reference to FIG. 3.

Figure 3:
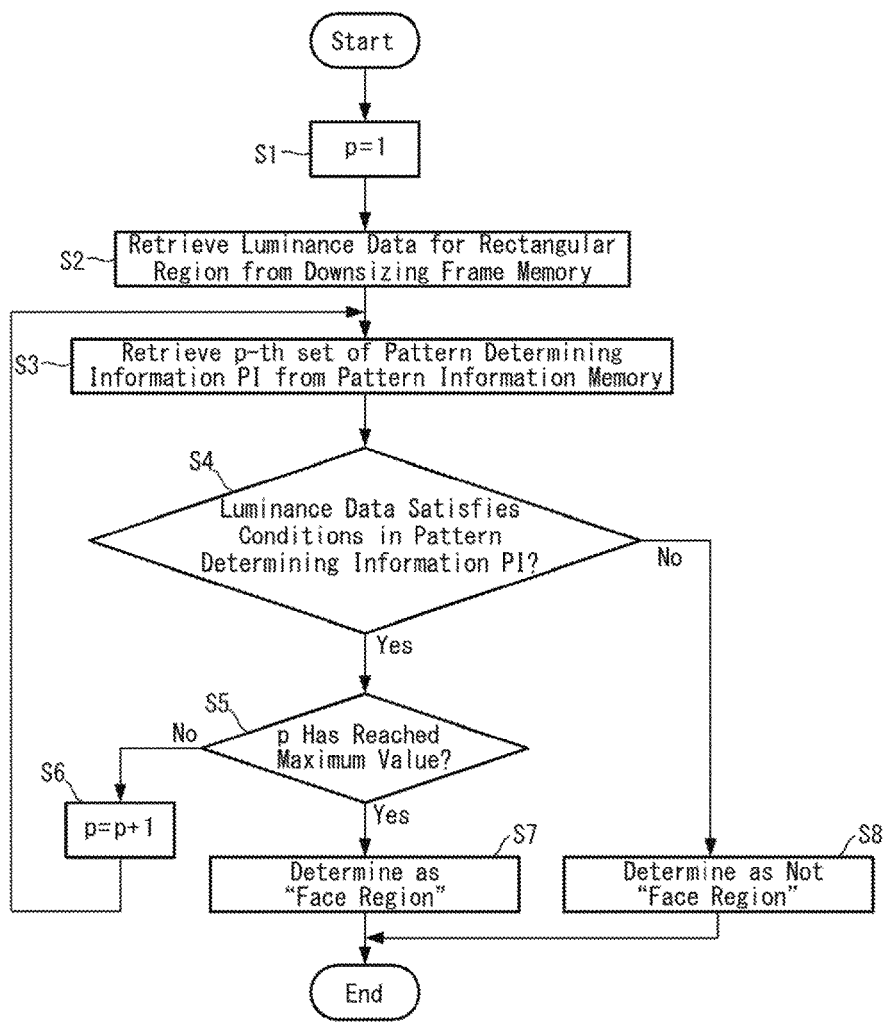
FIG. 3 is a flow chart depicting the flow of pattern determination performed by a pattern determination section in the face detection unit.

FIG. 3 is a flow chart depicting the flow of pattern determination performed by the pattern determination section 11 in the face detection unit 1. In this pattern determination, rectangular regions are set up in each frame of a video, and it is determined whether or not each rectangular region is a face region. Therefore, in the process starting in step S1, it is determined whether or not the rectangular region of interest is a face region. Rectangular regions are set up in a manner described later in reference to FIG. 4.

In step S1, the pattern determination section 11 sets a variable p to 1.

In step S2, the pattern determination section 11 retrieves luminance data for a rectangular region of interest from the downsizing frame memory 54.

In step S3, the pattern determination section II retrieves a p-th set of pattern determining information PI from the pattern information memory 13. The pattern determining information PI is for determining whether or not a rectangular region is a face region. The pattern information memory 13 stores therein plural sets of pattern determining information PI.

In step S4, the pattern determination section 11 determines whether or not the luminance data retrieved in step S2 satisfies the conditions stipulated in the p-th set of pattern determining information PI. Upon determining that the luminance data satisfies the conditions stipulated in the p-th set of pattern determining information PI, the pattern determination section 11 proceeds to step S5.

In step S5, the pattern determination section 11 determines whether or not the variable p has reached a maximum value. The maximum value constitutes a part of the pattern determining information PI stored in the pattern information memory 13. Upon determining that the variable p has not reached the maximum value, the pattern determination section 11 adds 1 to the variable p (p=p+1) in step S6 and implements step S3 and subsequent steps once again. On the other hand, upon determining that the variable p has reached the maximum value, the pattern determination section 11 proceeds to step S7.

In step S7, the pattern determination section 11 determines that the rectangular region of interest is a face region.

On the other hand, the pattern determination section 11, upon determining in step S4 that the luminance data does not satisfy the conditions stipulated in the p-th set of pattern determining information P1, proceeds to step S8 Where the pattern determination section 11 determines that the rectangular region of interest is not a face region.

According to the flow chart in FIG. 3, a rectangular region is determined to be a face region if the luminance data for the rectangular region satisfies the conditions stipulated in all pieces of the pattern determining information P1 stored in the pattern information memory 13. Alternatively, a rectangular region may be determined to be a face region if the luminance data for the rectangular region satisfies the conditions stipulated in a predetermined number of pieces of the pattern determining information PI stored in the pattern information memory 13.

Figure 4:
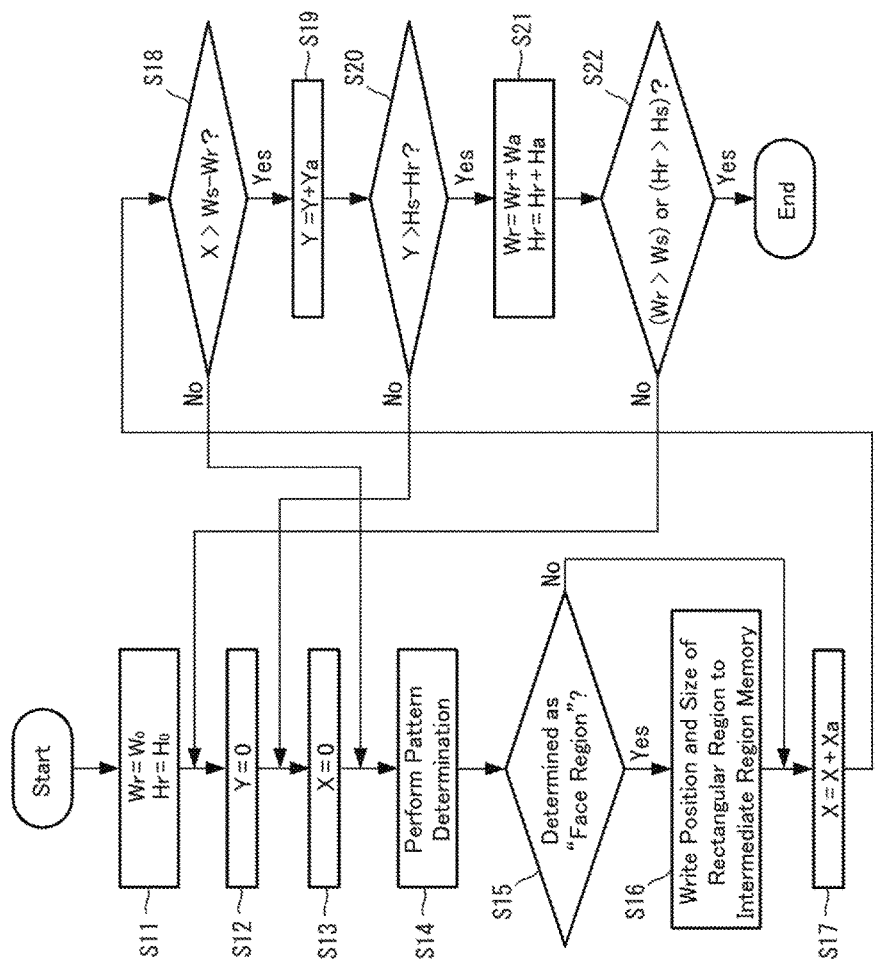
FIG. 4 is a flow chart depicting how rectangular regions to be processed are set up.

FIG. 4 is a flow chart depicting how rectangular regions to be processed are set up.

In step S11, the pattern determination section 11 sets the width Wr and height Hr of the rectangular region to $W_0$ and $H_0$ respectively (Wr=$W_0$, Hr=$H_0$). $W_0$ is an initial width of the rectangular region, and $H_0$ is an initial height of the rectangular region.

In step S12, letting (X, Y) denote the coordinates of the upper left one of the four corners of the rectangular region, the pattern determination section 11 sets the y coordinate to 0 (Y=0. The upper left corner of the display screen is assigned a set of reference coordinates (0, 0). The rightward direction on the screen is designated as the positive x-axis direction, and the downward direction on the screen is designated as the positive y-axis direction In step S13, the pattern determination section 11 sets the x coordinate in the set of coordinates (X, Y) of the upper left corner of the rectangular region to 0 (X=0).

In step S14, the pat determination section 11 subjects the rectangular region to the pattern determination described in reference to FIG. 3. When step S14 is implemented for the first time, a rectangular region will be processed that has a width Wr=$W_0$, a height Hr=$H_0$, and an upper left corner at (X, Y) (0, 0).

In step S15, the pattern determination section 11 determines whether or not the rectangular region is a face region. The pattern determination section 11, upon determining in the pattern determination that the rectangular region is a face region, proceeds to step S16. On the other hand, upon determining that the rectangular region is not a face region, the pattern determination section 11 skips step S16 and proceeds to step S17.

In step S16, the pattern determination section 11 writes information on the position and size of the rectangular region of interest into the intermediate region memory 12 as region information.

In step S17, the pattern determination section 11 adds Xa to the x coordinate in the set of coordinates (X, Y) of the upper left corner of the rectangular region (X=X+Xa). rectangular regions are set up in the present embodiment by slightly shifting in the x-axis direction (horizontal direction) and the y-axis direction(Vertical direction). Xa represents a distance by which each rectangular region is shifted in the x-axis direction to set up a next rectangular region.

In step S18, the pattern determination section 11 determines whether or not it holds that X>Ws−Wr, where Ws represents the width of the display screen. The pattern determination section 11, upon determining that it does not hold that X>Ws−Wr, returns to step S14 for pattern determination. On the other hand, upon determining that it holds that X>Ws−Wr, the pattern determination section 11 proceeds to step S19.

In step S19, the pattern determination section 11 adds Ya to the y coordinate the set of coordinates (X, Y) of the upper left corner of the rectangular region (Y=Y+Ya). Ya represents a distance by which each rectangular region is shifted in the y-axis direction to set up a next rectangular region.

In step S20, the pattern determination section 11 determines whether or not it holds that Y>Hs−Hr, where Hs represents the height of the display screen. The pattern determination section 11, upon determining that it does not hold that Y>Hs−Hr, returns to step S13 where the x coordinate in the set of coordinates (X, Y) of the upper left corner of the rectangular region is set to 0 (X=0) and then proceeds to step S14 for pattern determination On the other hand, upon determining that it holds that Y>Hs−Hr, the pattern determination section 11 proceeds to step S21.

In step S21, the pattern determination section 11 adds Wa to the width Wr of the rectangular region (Wr=Wr+Wa). Rectangular regions are set up in the present embodiment by slightly altering size. Wa represents an amount by which each rectangular region is increased in width to set up a next rectangular region. In addition, the pattern determination section 11 adds Ha to the height Hr of the rectangular region (Hr=Hr+Ha). Ha represents an amount by which each rectangular region is increased in height to set up a next rectangular region.

In step S22, the pattern determination section 11 determines whether at least either one of conditions (1) and (2) below is satisfied. The pattern determination section 11, upon determining that neither one of conditions (1)and (2) below is satisfied, implements step S12 and subsequent steps once again. On the other hand, upon determining that at least either one of conditions (1) and (2) below is satisfied, the pattern determination section 11 ends the process shown in the flow chart.

$$Wr>Ws \quad (1)$$

$$Hr>Hs \quad (2)$$

More specifically, the pattern determination section 11 performs pattern determination by firstly moving the smallest rectangular region from the far left side to the far right side along the top end of the display screen. Upon completing the pattern determination to the far right side, the pattern determination section 11 shifts the rectangular region vertically downward and continues the pattern determination by moving the rectangular region from the far left side to the far right side of the display screen. This process is repeated to perform the pattern determination from the far right side to the far left side and from the top end to the bottom end of the display screen. Upon completing the pattern determination across the entire display screen, the pattern determination section 11 slightly increases the width Wr and height Hr of the rectangular region and performs the pattern determination in the same manner across the entire display screen. The pattern determination is repeatedly performed across the entire display screen by increasing the width Wr and height Hr of the rectangular region from one repetition to the next. The pattern determination section 11 ends the pattern determination either when the width Wr of the rectangular region exceeds the width Ws of the display screen or when the height Hr of the rectangular region exceeds the height Hs of the display screen.

The pattern determining information P1 based on which it is determined whether or not a rectangular region is a face region does not stipulate highly restrictive conditions. Therefore, the rectangular region of interest is in some cases determined to be a face region even if the rectangular region is slightly offset from the actual face region in the horizontal and/or vertical direction(s). In addition, the rectangular region of interest is in some cases determined to be a face region even if the rectangular region has a slightly different size from the actual face region.

Therefore, if a rectangular region including a characteristic region is determined to be a face region, another rectangular region including the same characteristic region, but differently positioned or sized, may also be determined to be a face region. For convenience in subsequent processes, however, it is desirable if only one rectangular region corresponds to a certain characteristic region. For this reason, those rectangular regions, slightly different in position or size, which include the same face region will be merged into a single rectangular region.

Upon completing pattern determination for one frame, the pattern determination section 11 retrieves region information from the intermediate region memory 12 and if the retrieved region information contains more than one set of region information for the same face region, these sets of region information are merged into a single set. For example, the positions and sizes of a plurality of rectangular regions determined to be region information for the same face region are averaged. The averaged position and size are designated as region information for the merged region.

The pattern determination section 11 writes region information for the merged region into the merged region memory 14. The pattern determination section 11 also transfers the total number of rectangular regions written into the merged region memory 14 to the region information processing section 21 in the region information unit 2.

Next will he described the processes performed by the region information unit 2. One of the first region information memory 22 and the second region information memory 23 stores therein results of the last round of region information processing performed by the region information processing section 21. The region information processing section 21 retrieves the results of the last round of region information processing from one of the memories that contains the results of the last round of region information processing, to perform region information processing (detailed later) based on the retrieved results of the last round of region information processing and new information on the position and size (region information) of a rectangular region contained in the merged region memory 14. The region information processing section 21 writes results of the current round of region information processing into one of the first region information memory 22 and the second region information memory 23 that does not contain the results of the last round of region information processing. Upon completing the writing of the results of the current round of region information processing, the region information processing section 21 transfers these contents to a mixing unit buffer in the mixing unit 4.

The mixing unit buffer includes the first mixing unit buffer 43 and the second mixing unit buffer 44. The processing strength generation section 41 is constantly accessing one of the first mixing unit buffer 43 and the second mixing unit buffer 44 while a video is being displayed, to yield processing strengths for processing of an input video and a video signal outputted from the image processing unit 3. Therefore, the region information processing section 21 writes results of region information processing to either one of the first mixing unit buffer 43 and the second mixing unit buffer 44 that is not being accessed by the processing strength generation section 41. The region information processing section 21 transfers to the processing strength generation section 41 a signal indicating that the region information processing section 21 has written the results to that one of the mixing unit buffers.

The processing strength generation section 41, upon receiving from the region information processing section 21 the signal indicating that the results have been written to one of the mixing unit buffers, swaps the first mixing unit buffer 43 and the second mixing unit buffer 44 in a next vertical flyback period. This swapping renders the new information transferred from the region information processing section 21 available to the processing strength generation section 41.

After the region information processing section 21 completes the transfer from the region information memory to a mixing unit buffer, the preliminary processing unit 5 waits for a next vertical flyback period. When the preliminary processing unit 5 starts processing again. Specifically, the writing to the downsizing frame memory 54 is resumed.

The processing in which the face detection unit 1 detects a face region in an input video and the region information processing section 21 sends results of region information processing to the mixing unit 4 is repeatedly performed by sequentially and repeatedly implementing the above-described series of processes from the preliminary processing unit 5 to the mixing unit 4.

Next will be described a path through which the input video is fed to the mixing unit 4 and the image processing unit 3.

The mixing unit 4 drives a counter circuit therein using, for example, a vertical synchronization signal (Vsync) and a horizontal display signal (Hdisp) as references and calculates a position (i.e., x and y coordinates) in one frame of the video signal that is currently being fed.

The mixing unit buffers in the mixing unit 4 contain processed region information. The region information includes the x and y coordinates of the upper left corner of a rectangular region, the width W and height H of the rectangular region, a presence rate E of the rectangular region, and a frame-to-frame increase/decrease, ΔE, of the presence rate E. The frame-to-frame increase/decrease, ΔE, of the presence rate E is a small amount by which the presence rate E is altered per step as will be described later in detail.

Let $X_i$, $Y_i$, $W_i$, $H_i$, $E_i$, and $\Delta E_i$ respectively represent the x coordinate, y coordinate, width, height, presence rate, and frame-to-frame increase/decrease of the presence rate in an i-th set of region information.

Figure 5:
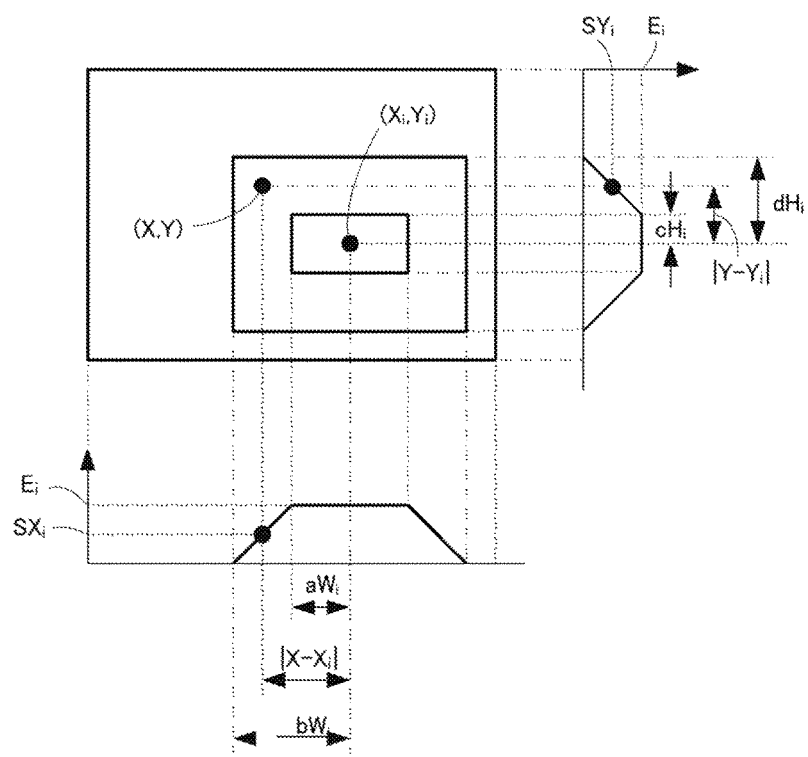
FIG. 5 is a diagram illustrating how a processing strength, $SX_i$, for the x-axis direction and a processing strength, $SY_i$, for the y-axis direction are calculated for an i-th set of region information for coordinates (X, Y).

FIG. 5 is a diagram illustrating how a processing strength, $SX_i$, for the x-axis direction and a processing strength, $SY_i$, for the y-axis direction are calculated for the i-th set of region information for coordinates (X, Y). The processing strength, $SX_i$, for the x-axis direction is given by equations (3) to (5) below:

$$\text{if } |X-X_i| \leq aW_i, \ SX_i = E_i \qquad (3)$$

$$\text{if } |X-X_i| \geq bW_i, \ SX_i = 0 \qquad (4)$$

$$\text{if } aW_i < |X-X_i| < bW_i, SX_i = E_i \cdot \{1-(|X-X_i|-aW_i)/(bW_i-aW_i)\} \qquad (5)$$

Meanwhile, the processing strength, $SY_i$, for the y-axis direction is given by equations (6) to (8) below:

$$\text{if } |Y-Y_i| \leq cH_i, \ SY_i = E_i \qquad (6)$$

$$\text{if } |Y-Y_i| \geq dH_i, \ SY_i = 0 \qquad (7)$$

$$\text{if } cH_i < |Y-Y_i| < dH_i, \ SY_i = E_i \cdot \{1(|Y-Y_i|-cH_i)/(dH_i-cH_i)\} \qquad (8)$$

In equations (3) to (8), a, b, c, and d are constants used to determine the distribution shape of the processing strengths.

As shown in FIG. 5, if $aW_i < |X-X_i| < bW_i$, the closer $|X-X_i|$ is to $aW_i$, the closer the value of the processing strength $SX_i$ is to $E_i$, and the closer $|X-X_i|$ is to $bW_i$, the closer the value of the processing strength $SX_i$ is to 0. If $cH_i < |Y-Y_i| < dH_i$, the closer $|Y-Y_i|$ is to $cH_i$, the closer the value of the processing strength $SY_i$ is to $E_i$, and the closer $|Y-Y_i|$ is to $dH_i$, the closer the value of the processing strength $SY_i$ is to 0. The processing strengths, defined in this manner, can suppress sharp changes of image quality at and near the boundary of a face region.

The processing strength Si for coordinates (X, Y) obtained from the i-th set of region information is calculated by equation (9) below:

$$S_i = \text{MIN}(SX_i, SY_i) \qquad (9)$$

where MIN is a function that returns a minimum one of the values given in parentheses.

When there are n sets of region information, the processing strengths $S_i$ (i=1 to n) are calculated for all the region information before an ultimate processing strength S is calculated equation (10) below:

$$S = \text{MAX}(S_1, S_2, \ldots, S_{n-1}, S_n) \qquad (10)$$

where MAX is a function that returns a maximum one of the values given in parentheses.

If the presence rate E has a value in the range 0≤E≤1, the processing strength S also has a value in the range 0≤S≤1.

The processing strength generation section 41 calculates a processing strength S for the coordinates of each pixel contained in the inputted video signal by the above-described method from n sets of region information in accordance with the coordinates. The image generation section 42 mixes the input video signal and the video signal subjected to image processing in the image processing unit 3 based on the processing strength S calculated by the processing strength generation section 41, to generate an output video.

Letting Rin, Gin, and Bin he the pixel values of the input video in RGB data format, Rproc, Gproc, and Bproc be the pixel values of the video subjected to image processing in the image processing unit 3, and Rout, Gout, and Bout be the pixel values of the output video signal, the pixel values of the output video signal are given by the set of equations (11) below:

$$Rout=Rin(1-Se)+Rproc \cdot Se$$

$$Gout=Gin(1-Se)+Gproc \cdot Se$$

$$Bout=Bin(1-Se)+Bproc \cdot Se \quad (11)$$

In equations (11), Se is an adjusted processing strength. To perform specific image processing on a face region in a frame, Se is calculated from equation (12) below:

$$Se=S \cdot t \quad (12)$$

where t is an adjusting parameter that is set to an appropriate value in the range 0≤t≤1.

Hence, an output video can be generated in which the face regions in each frame of the video have been subjected to specific image processing. In this method, if no face regions are detected, the raw input video is outputted as the output video without going through the image processing unit 3.

Alternatively, an output video may be generated in which specific image processing has been performed on regions other than the face regions, in other words, regions other than characteristic regions. For example, a human may be detected as a characteristic region, to subject the remaining non-human and background regions to specific image processing. When this is the case, the adjusted processing strength Se is calculated from equation (13) below:

$$Se=1-S \cdot t \quad (13)$$

If no thee regions are detected when the adjusted processing strength Se is calculated from equation (13), the video having gone through the image processing unit 3 is outputted straightly as the output video.

By the method described so far, the specific image processing can be performed on the face regions in the input video at a mix ratio (adjusted processing strength Se) that is in accordance with the processing strength. When the adjusted processing strength Se is specified by equation (13), a video can be outputted in which specific image processing has been performed on the non-face regions at a mix ratio (adjusted processing strength Se) that is in accordance with the processing strength.

In the present embodiment, when a new face region is detected, the processing strength for the specific image processing to be performed on the detected new face region is increased stepwise in at least two steps by a small amount at a time. The language "in at least two steps" means that the processing strength is altered between a minimum value, a maximum value, and at least one intermediate value between the minimum and maximum values of the processing strength. There may be a single intermediate value or more than one intermediate value. When the face region becomes no longer detected, the processing strength for the specific image processing having been performed on the face region is decreased stepwise in at least two steps by a small amount at a time. This combination of processes enables stepwise changes of the processing strength in at least two steps that involve an intermediate value, thereby inhibiting the processing strength from both abruptly changing from the minimum value to the maximum value and abruptly changing from the maximum value to the minimum value.

The processing strength is determined based on the presence rate E in each region (see equations (3) to (10)). It could take a processing time that is equivalent to a few frames to a few tens of frames to determine the presence rate E if the process goes through a processing path of determining a new presence rate E, that is, through the downsizing section 52, the pattern determination section 11, and the region information processing section 21, because a significant amount of processing needs to be done in some cases particularly in the pattern determination section 11. Therefore, if there is a need to alter the presence rate E more frequently or from one frame to the next, this processing is performed by the processing strength generation section 41 in the mixing unit 4.

The processing strength generation section 41 has the presence rate E for each region and the frame-to-frame increase/decrease, ΔE, of the presence rate E stored in the mixing unit buffer as region information.

Letting E represent the presence rate in the current frame, ΔE the frame-to-frame increase/decrease of the presence rate E, and E' the presence rate in the next frame, E' is given by equation (14) below:

$$E'=E+\Delta E \quad (14)$$

Note that the frame-to-frame increase/decrease ΔE, of the presence rate E has a positive value when a face region is being detected and a negative value when no face region is being detected.

The processing strength generation section 41 obtains the presence rate E' in the next frame for all region information stored in the mixing unit buffer every time a new vertical flyback period starts. This process increases or decreases the processing strength stepwise by a small amount at a time from one frame to the next.

Now, the processes performed by the region information processing section 21 will be described.

Figure 6:
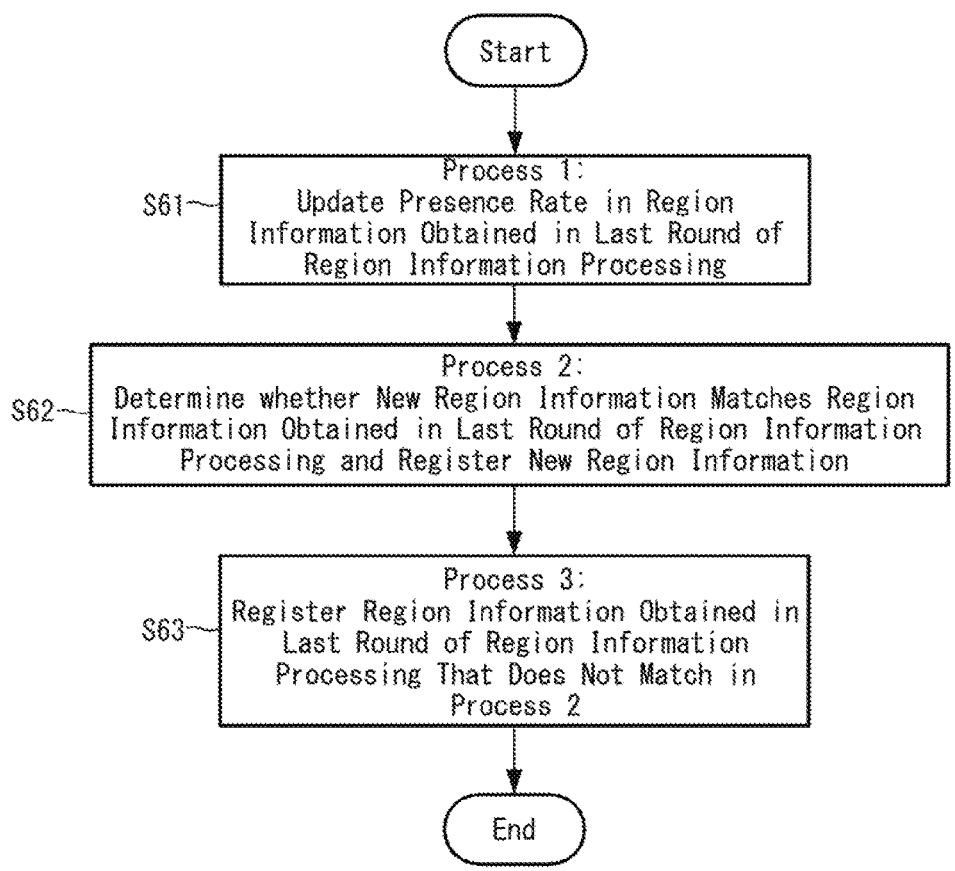
FIG. 6 is a flow chart depicting specific processes performed by a region information processing section.

FIG. 6 is a flow chart depicting specific processes performed by the region information processing section 21. The region information processing section 21 performs three processes: process 1 to process 3 shown in FIG. 6.

In step S61, the region information processing section 21 updates the presence rate E, which is a part of the region information obtained as a result of the last round of region information processing (process 1). The region information containing a presence rate F that is less than or equal to 0 is deleted as a result, In step S62, the region information processing section 21 determines whether or not the new region information obtained by pattern determination matches the last region information (process 2). In this matching determination, it is determined whether or not the face region newly detected matches the face region detected in any of the preceding rounds of pattern determination. The position and size of the region for which such matching is confirmed by the matching determination are updated to the associated values in the new region information. The presence rate E in the last region information is used as is. On the other hand, if no region information that matches the new region information is found in the matching determination, the region information processing section 21 registers new region information.

In step S63, the region information processing section 21 registers the region information, obtained as a result of the last round of region information processing, that did not match the new region information in process 2 (process 3). The "region information, in the last region information, that did not match the new region information" refers to the region that had been detected as a face region, but was no longer detected as such in the succeeding frame. The frame-to-frame increase/decrease, $\Delta E$, of the presence rate for such a region is set to a negative value.

Figure 7:
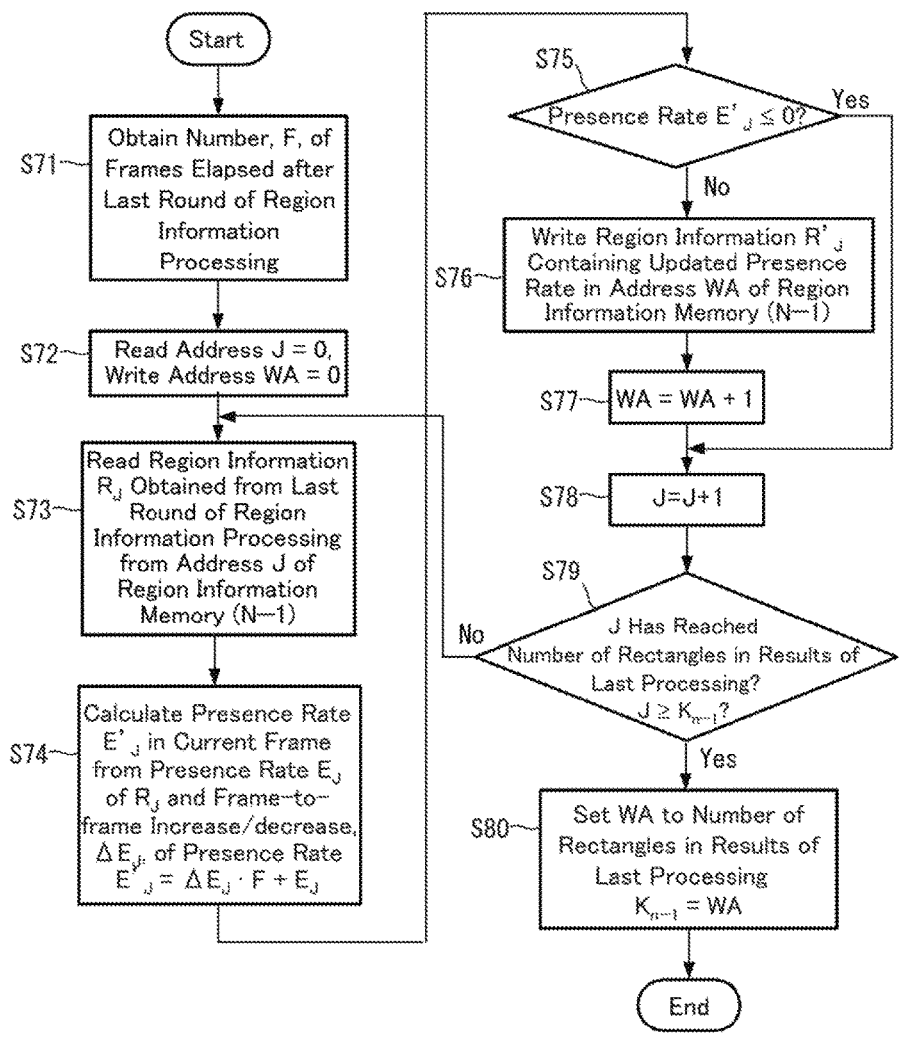
FIG. 7 is a flow chart depicting specific details of process 1 performed in step S61 shown in FIG. 6 by the video processing device in accordance with the first embodiment

The following description will, in reference to FIGS. 7 to 9, elaborate on the processes performed in steps S61 to S63 shown in FIG. 6.

FIG. 7 is a flow chart depicting specific details of process 1 performed in step S61 shown in FIG. 6. In the following description, one of the first region information memory 22 and the second region information memory 23 that contains results of the last round of region information processing will be referred to as the region information memory (N−1), and the one to which results of the current round of region information processing will be written will be referred to as the region information memory (N). Therefore, the first and second region information memories 22 and 23 are used alternately in each round of region information processing, by designating, every time a round of region information processing is completed, one of these memories that has been used as the region information memory (N) as the region information memory (N−1) and the other memory as the region information memory (N).

In step S71, the region information processing section 21 obtains the number, F, of frames elapsed after the last round of region information processing.

In step S72, the region information processing section 21 sets both a read address I and a write address WA to 0.

In step S73, the region information processing section 21 reads region information $R_J$ obtained as a result of the last round of region information processing from the address J of the region information memory (N−1).

In step S74, the region information processing section 21 calculates a presence rate $E'_J$ in the current frame from a presence rate $E_J$ and a frame-to-frame increase/decrease, $\Delta E_J$, of the presence rate in the region information $R_J$, using equation (15) below:

$$E'_J = \Delta E_J \cdot F + E_J \tag{15}$$

In step S75, the region information processing section 21 determines whether or not the presence rate $E'_J$ calculated in step S74 is less than or equal to 0. The region information processing section 21, upon determining that the presence rate $E'_J$ is less than or equal to 0, skips steps S76 and S77 and proceeds to step S78, which as a result deletes the region information in which the presence rate $E'_J$ is less than or equal to 0. On the other hand, upon determining that the presence rate $E'_J$ is neither less than nor equal to 0, the region information processing section 21 implements step S76.

In step S76, the region information processing section 21 writes region information $R'_J$ in which the presence rate has been updated to the address WA of the region information memory (N−1).

In step S77, the region information processing section 21 adds 1 to the write address WA (WA=WA+1).

In step S78, the region information processing section 21 adds 1 to the read address J (J=J+1).

In step S79, the region information processing section 21 determines whether or not the read address J has reached the number of rectangular regions $K_{n-1}$ obtained as a result of the last round of region information processing, that is, whether or not it holds that $J \geq K_{n-1}$. The region information processing section 21 implements step S73 and subsequent steps again upon determining that it does not hold that $J \geq K_{n-1}$ and implements step S80 upon determining that it holds that $J \geq K_{n-1}$.

In step S80, the region information processing section 21 sets the write address WA to the number of rectangular regions $K_{n-1}$ obtained as a result of the last round of region information processing ($K_{n-1}$=WA).

FIG. 8 is a flow chart depicting specific details of process 2 performed in step S62 shown in FIG. 6.

In step S81, the region information processing section 21 initializes all match flags Mflag(0 to $K_{n-1}$) by setting them to 0. The match flag Mflag will be described later in detail.

In step S82, the region information processing section 21 sets an address I to 0.

In step S83, the region information processing section 21 reads new region information from the address I of the merged region memory 14. The region information thus read out will be denoted by $R_I$.

In step S84, the region information processing section 21 deletes stored region information $R_M$ and sets the address J to 0. The region information $R_M$ is stored in step S88 (detailed later).

In step S85, the region information processing section 21 reads region information obtained as a result of the last round of region information processing from the address J of the region information memory (N−1). The region information thus read out is denoted by $R_J$.

In step S86, the region information processing section 21 determines whether or not the position and size of a rectangular region in the region information $R_I$ have values that are respectively within prescribed neighborhoods of the values of the position and size of a rectangular region in the region information $R_J$. An example method by which to make such a determination will be described next.

Letting X1; Y1; W1, and H1 respectively denote the x coordinate, y coordinate width, and height (of the upper left corner) of a first one of two rectangular regions and X2, Y2, W2, and H2 respectively denote the x coordinate, y coordinate, width, and height (of the upper left corner) of the second rectangular region, the coordinates (CX1, CY1) and (CX2, CY2) of the centers of the rectangular regions are given by equations (16) and (17) below:

$$(CX1, CY1) = (X1 + W1/2, Y1 + H1/2) \tag{16}$$

$$(CX2, CY2) = (X2 + W2/2, Y2 + H2/2) \tag{17}$$

It is determined that the positions and sizes of the rectangular regions in the region information $R_I$ and the region information $R_J$ are within prescribed neighborhoods if all the conditions represented by inequalities (18) to (21) below are met.

$$|CX1 - CX2| \leq X\_TH \tag{18}$$

$$|CY1 - CY2| \leq Y\_TH \tag{19}$$

$$|W1 - W2| \leq W\_TH \tag{20}$$

$$|H1 - H2| \leq H\_TH \tag{21}$$

X_TH, Y_TH, W_TH, and H_TH in inequalities (18) to (21) are threshold values and defined as in the following:

If $W1 \geq W2$, $X\_TH = W2 \cdot Rcent$, and $W\_TH = W2 \cdot Rside$

If $W1 < W2$, $X\_TH = W1 \cdot Rcent$, and $W\_TH = W1 \cdot Rside$

If $H1 \geq H2$, $Y\_TH = H2 \cdot Rcent$, and $H\_TH = H2 \cdot Rside$

If $H1 < H2$, $Y\_TH = H1 \cdot Rcent$, and $H\_TH = H1 \cdot Rside$

In these equations, Rcent and Rside are constants for calculating the threshold values.

The region information processing section 21 implements step S87 upon determining that the positions and sizes of the rectangular regions in the region information $R_I$ and the region information $R_J$ are within prescribed neighborhoods. On the other hand, upon determining that the positions and sizes of the rectangular regions in the region information $R_I$ and the region information $R_J$ are not within prescribed neighborhoods, the region information processing section 21 implements step S89.

In step S87, the region information processing section 21 determines whether or not at least one of the following conditions is met: (i) the rectangular region in the region information $R_J$ is closer to the region information $R_I$ than the rectangular region in the stored region information $R_M$ is to the region information $R_I$; and (ii) the region information $R_M$ does not exist. The following method is used to determine whether or not the rectangular region in the region information $R_J$ is closer to the region information $R_I$ than the rectangular region in the stored region information $R_M$ is to the region information $R_I$.

Let $CX_{IM}$ and $CY_{IM}$ respectively denote the horizontal and vertical center-to-center distances between the rectangular region in the region information $R_I$ and the rectangular region in the region information $R_M$ and also let $CX_{IJ}$ and $CY_{IJ}$ respectively denote the horizontal and vertical center-to-center distances between the rectangular region in the region information $R_I$ and the rectangular region in the region information $R_J$. If $CX_{IM} > CX_{IJ}$ and $CY_{IM} > CY_{IJ}$ it is determined that the rectangular region in the region information $R_J$ is closer to the region information $R_I$ than the rectangular region it :he stored region information $R_M$ is to the region information $R_I$.

The region information processing section 21 proceeds to next step S88 if YES in step S87 and skips step S88 and proceeds to step S89 if NO in step S87.

In step S88, the region information processing section 21 stores the region information $R_J$, replacing the region information $R_M$, as region information for the rectangular region that best matches the region information $R_I$. The values of the address at that time is also stored in the region information $R_J$ as J'.

In step S89, the region information processing section 21 adds 1 to the address J (J=J+1).

In step S90, the region information processing section 21 determines whether or not the address J has reached the number $K_{n-1}$ in the region information obtained as a result of the last round of region information processing, that is, whether or not it holds that $J \geq K_{n-1}$. The region information processing section 21 implements step S85 and subsequent steps again upon determining that it does not hold that $J \geq K_{n-1}$ and implements step S91 upon determining that it holds that $J \geq K_{n-1}$.

In step S91, the region information processing section 21 determines whether or not there exists region information that was stored as the region information $R_M$. The region information processing section 21 implements step S92 upon determining that there does not exist region information that was stored as the region information $R_M$ and implements step S93 upon determining that there exists region information that was stored as the region information $R_M$.

In step S92, the region information processing section 21 writes new region information $R_I$, the initial value of the presence rate E, and the initial value of the frame-to-frame increase/decrease, $\Delta E$, of the presence rate E in the address I of the region information memory (N) as region information. For these initial values of the presence rate E and the frame-to-frame increase/decrease, $\Delta E$, of the presence rate E, predetermined values are used.

Meanwhile, in step S93, the region information processing section 21 writes, in the address I of the region information memory (N), information on the position and size of a rectangular region in the region information $R_I$, the presence rate E of a rectangular region in the region information $R_M$, and information on the frame-to-frame increase/decrease of presence rate $\Delta E$ as region information.

In step S94, the region information processing section 21 sets the match flag Mflag(J'), which corresponds to the value of J' stored in the region information $R_M$, to 1. Specifically, if a rectangular region is detected that is within a prescribed neighborhood in position and size of a rectangular region being detected as a face region, the region information processing section 21 determines that the same face region has been consecutively detected and sets the match flag Mflag to 1.

In step S95, the region information processing section 21 adds 1 to the address I (I=I+1).

In step S96, the region information processing section 21 determines whether or not the address I has reached the number, $K_n$, of sets of current region information, that is, whether or not it holds that $I \geq K_n$. The region information processing section 21 implements step S83 and subsequent steps again upon determining that it does not hold that $I \geq K_n$ and ends the process shown in the flow chart upon determining that it holds that $I \geq K_n$.

FIG. 9 is a flow chart depicting specific details of process 3 performed in step S63 shown in FIG. 6.

In step S101, the region information processing section 21 sets the address J to 0.

In step S102, the region information processing section 21 determines whether or not the match flag Mflag(J) in the address J is 0. The region information processing section 21 then implements next step S103 upon determining that the match flag Mflag(J) in the address J is 0 and implements step S106 upon determining that the match flag Mflag(J) in the address J is not 0.

In step S103, the region information processing section 21 reads region information obtained as a result of the last round of region information processing from the address J of the region information memory (N−1). The region information thus read out is denoted by $R_J$.

In step S104, the region information processing section 21 writes the region information $R_J$ in the address I of the region information memory (N). A negative initial value is written as the frame-to-frame increase/decrease of presence rate $\Delta E$ included in the region information $R_J$.

In step S105, the region information processing section 21 adds 1 to the address I (I=I+1).

In step S106, the region information processing section 21 adds 1 to the address J (J=J+1).

In step S107, the region information processing section determines whether or not the address J has reached the number, $K_{n-1}$, of sets of region information obtained as a result of the last round of region information processing, that is, whether or not it holds that $J \geq K_{n-1}$. The region information processing section 21 implements step S102 and subsequent steps again upon determining that it does not hold that $J \geq K_{n-1}$ and implements step S108 upon determining that it holds that $J \geq K_{n-1}$.

In step S108, the region information processing section 21 sets the address I to the number, Kn, of sets of region information obtained as a result of the current round of region information processing ($K_n$=I).

Figure 10A:
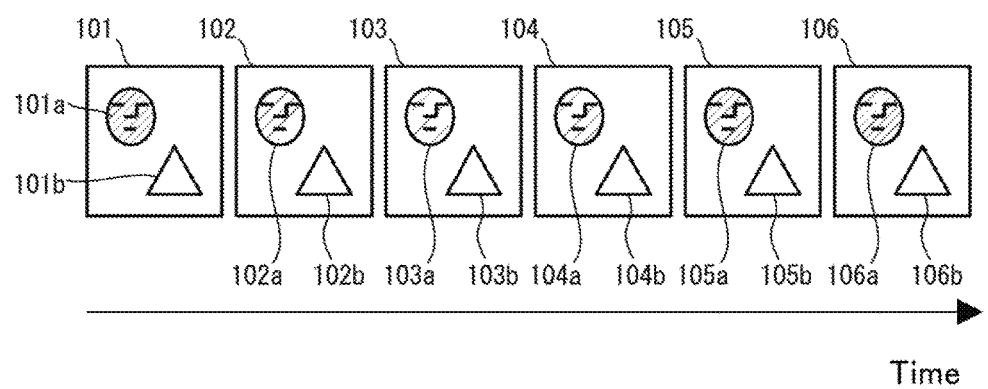
FIG. 10A is a diagram illustrating results of processes when a face region has not been completely detected in sonic frames of a video.
Figure 10B:
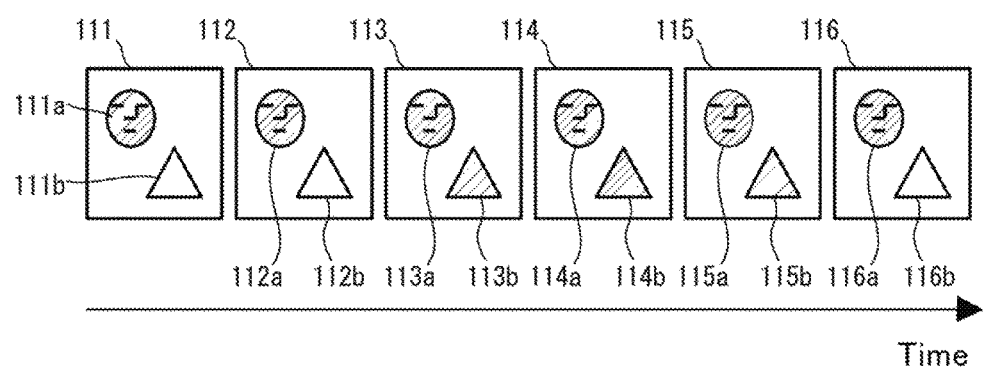
FIG. 10B is a diagram illustrating results of processes when a non-face region has been wrongly detected as a face region in some frames of a video.

Effects of the video processing performed by the video processing device in accordance with the first embodiment will be described. FIG. 10A illustrates results of the processes when a face region has not been completely detected in some frames of a video. FIG. 10B illustrates results of the processes when a non-face region has been wrongly detected as a face region in some frames of a video.

Images 101 to 106 in FIG. 10A are temporally consecutive component images of a video. In these images 101 to 106, a human face is tagged with an "a" and a non-human object with a "b."

In the video processing device in accordance with the present embodiment, when a human face is newly detected, the processing strength for specific image processing performed on the detected face region is increased stepwise by a small amount at a time. If a human face becomes no longer detected at the location where the face has been detected, the processing strength for the specific image processing performed on the region is decreased stepwise by a small amount at a time.

The example shown in FIG. 10A assumes that the face is not detected in the images 102 and 103 due to incomplete detection. In this case, a face 101a is detected in the image 101. In the image 102, although the face 101a is no longer detected due to incomplete detection, the region that has been detected as a face region is still subjected to the specific image processing, but with a decreased processing strength. Likewise, in the next image 103, although the face is not detected due to incomplete detection, the region that was detected as a face region is still subjected to the specific image processing, but with a further decreased processing strength.

Thereafter, in the image 104, a face 104a is detected again, and the face region is subjected to the specific image processing with a processing strength that is increased over the processing strength applied to the image 103. A face 105a is detected also in the image 105, and the face region is subjected to the specific image processing with a processing strength that is increased over the processing strength applied to the image 104.

To put it into perspective, when a human face that has been detected becomes no longer detected due to incomplete detection, the specific image processing is not abruptly discontinued, but continuously performed with a processing strength that is decreased stepwise by a small amount at a time. This technique can prevent the user from having a sense of strangeness to see abrupt changes in, for example, luminance and shades of color of the same face when the user watches a video made up of consecutive frames.

In addition, when a non-face region is wrongly detected as a face region, the specific image processing is not abruptly started to be performed with a predetermined processing strength on the wrongly detected region, but performed with a processing strength that is increased stepwise by a small amount at a time.

Images 111 to 116 in FIG. 1013 are also temporally consecutive component images of a video. In these images 111 to 116, a human face is tagged with an "a," and a non-human object with a "b." Assume that objects 113b and 114b in the images 113 and 114 are wrongly detected as a face.

In FIG. 10B, the object 113b in the image 113 is wrongly detected as a face region. The region of the object 113b is however not subjected to the specific image processing with a maximum processing strength, but with a low processing strength. In the next image 114, the object 114b is again wrongly detected as a face, and the region of the object 114b is subjected to the specific image processing with a processing strength that is increased over the processing strength applied to the image 113.

In the image 115, an object 115b is not detected as a face region, and the region of the object 11.5b is subjected to the specific image processing with a processing strength that is decreased over the processing strength applied to the image 114. An object 116b in the image 116 is again not detected as a face region, and the processing strength is decreased over the processing strength applied to the image 115 so that the region of the object 116b is not subjected to the specific image processing similarly to, for example, the images 111 and 112.

This technique can inhibit the specific image processing from being started to be performed with a high processing strength on a non-face region that is wrongly detected as a face region and hence when the user watches a video made up of consecutive frames, prevent abrupt changes in, for example, luminance and shades of color of the region wrongly detected as a face region.

Note that in this example, a face region is detected in a frame with a result of the detection being reflected in the same frame, for easy understanding of effects. In actual processing, however, it will often take time that is equivalent to a few frames to a few tens of frames from the detection of a face region to the generation of a result. In such a case, the result is reflected in an image a few frames to a few tens of frames later, and the processing strength is controlled accordingly by setting the increase or decrease of the processing strength from one frame to the next to a small amount.

Second Embodiment

A video processing device in accordance with the second embodiment has the same configuration as the video processing device in accordance with the first embodiment shown in FIG. 1. However, the face detection unit 1, the region information unit 2, and the mixing unit 4 perform different processes.

The pattern determination section 11 in the face detection unit 1, when a plurality of sets of region information stored in the intermediate region memory 12 are merged, counts the number of the merged sets of region information and writes the count as a detection degree to the merged region memory 14.

As mentioned earlier, the pattern determining information P1 based on which it is determined whether or not a rectangular region is a face region does not stipulate highly restrictive conditions. Therefore, the rectangular region of interest is in some cases determined to be a face region even if the rectangular region is slightly offset from the actual face region in the horizontal and/or vertical direction(s). In addition, the rectangular region of interest is in some cases determined to be a face region even if the rectangular region has a slightly different size from the actual face region. Therefore, the rectangular region determined to be a face region in some cases includes therein a region that, although differently positioned or sized, is still determined to be part of a face region.

Additionally, the closer the luminance data for a region in the rectangular region of interest is to conditions stipulated in the pattern determining information P1, the more likely the region is detected as a face region even if the rectangular region is slightly offset in the horizontal and/or vertical direction(s) or has a slightly different size.

Therefore, the more rectangular regions are detected as a part of a face region, the more likely the rectangular region including a region is a face region. As mentioned earlier, when a plurality of sets of region information are merged, the detection degree is the number of merged sets of region information. The larger the detection degree, the more likely the merged rectangular region is a face region (characteristic region).

Therefore, in the present embodiment, the detection degree is calculated as an indicator of the probability of the rectangular region being a face region, and the processing strength is set in accordance with the calculated detection degree. Specifically, the region information processing section 21 sets at least one of the maximum and initial values of the presence rate E and the frame-to-frame increase/decrease of presence rate $\Delta E$ in accordance with the detection degree to a value that increases with an increase of the detection degree.

It may be any one of the maximum and initial values of the presence rate E and the frame-to-frame increase/decrease of presence rate $\Delta E$ that is set in accordance with the detection degree. Alternatively, any two of these values or all of the values may be set in accordance with the detection degree. For example, if the maximum value of the presence rate E is set in accordance with the detection degree, the processing strength with which the specific image processing is performed is higher in a region where the probability of a face being present is higher (where the detection degree is higher); the processing strength with which the specific image processing is performed is lower in a region where the probability of a face being present is lower (where the detection degree is lower). This technique enables the specific image processing to be performed on each detected face region with a processing strength in accordance with the probability of a face being present in that region, thereby generating a higher quality video.

If the initial value of the presence rate E or the frame-to-frame increase/decrease $\Delta E$ is set in accordance with the detection degree, the presence rate reaches a maximum value more quickly in a region where the probability of a face being present is higher. This technique enables the processing strength with which the specific image processing is performed to reach a maximum value more quickly in a region where the probability of a face being present is higher, thereby generating a higher quality video.

Third Embodiment

A video processing device in accordance with the third embodiment has the same configuration as the video processing device in accordance with the first embodiment shown in FIG. 1. However, the region information unit 2 performs different processes.

In the video processing device in accordance with the present embodiment, the region information unit 2 uses a region validity flag Aflag and a detection count D (described later in detail) as additional region information.

The following description will focus on some of the processes performed by the video processing device in accordance with the third embodiment that differ from the processes performed by the video processing device in accordance with the first embodiment. Those processes performed by the video processing device in accordance with the third embodiment that differ from the processes performed by the video processing device in accordance with the first embodiment are steps S61 to S63 (processes 1 to 3) in the flow chart shown in 6.

Figure 11:
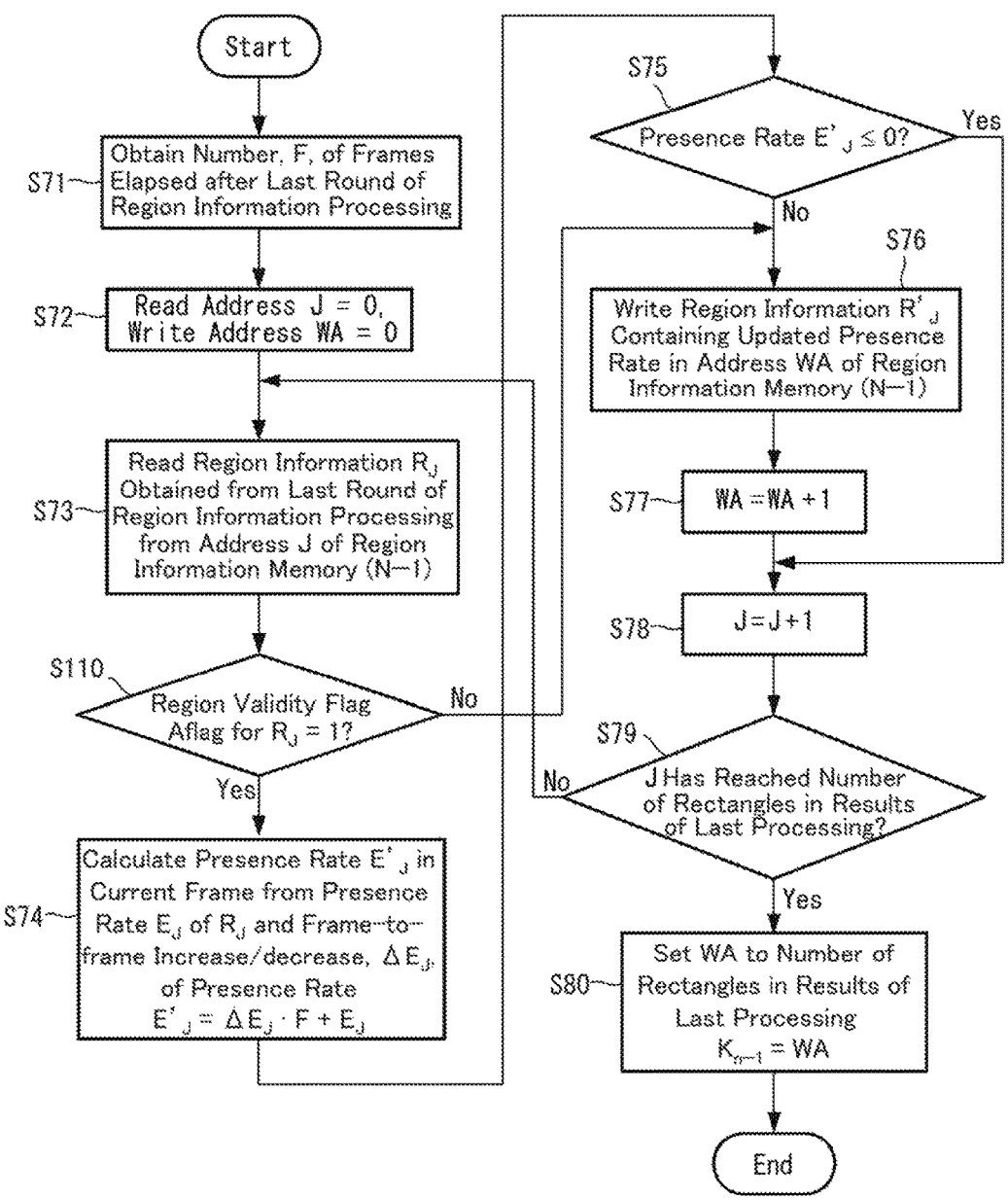
FIG. 11 is a flow chart depicting specific details of process 1 performed in step S61 shown in FIG. 6 by the video processing device in accordance with the third embodiment.

FIG. 11 is a flow chart depicting specific details of process 1 performed in step S61 shown in FIG. 6 by the video processing device in accordance with the third embodiment. Those processes in the flow chart shown in FIG. 11 that are the same as in the flow chart shown in FIG. 7 will be denoted by the same reference signs, and their detailed description will not be repeated.

In step S110 which ensues from step S73, the region information processing section 21 determines whether or not the region validity flag Aflag for the region information $R_J$ is 1. How the region validity flag Aflag is set will be described later in detail in reference to FIG. 12. The region information processing section 21 implements step S74 upon determining that the region validity flag Aflag for the region information $R_J$ is 1 and implements step S76 upon determining that the region validity flag Aflag for the region information $R_J$ is 0.

In other words, if the region validity flag Aflag is 1, the presence rate E is updated (step S74), and it is then determined whether or not the presence rate E is less than or equal to 0 (step S75); if the region validity flag Aflag is 0, these steps are not implemented.

Figure 12:
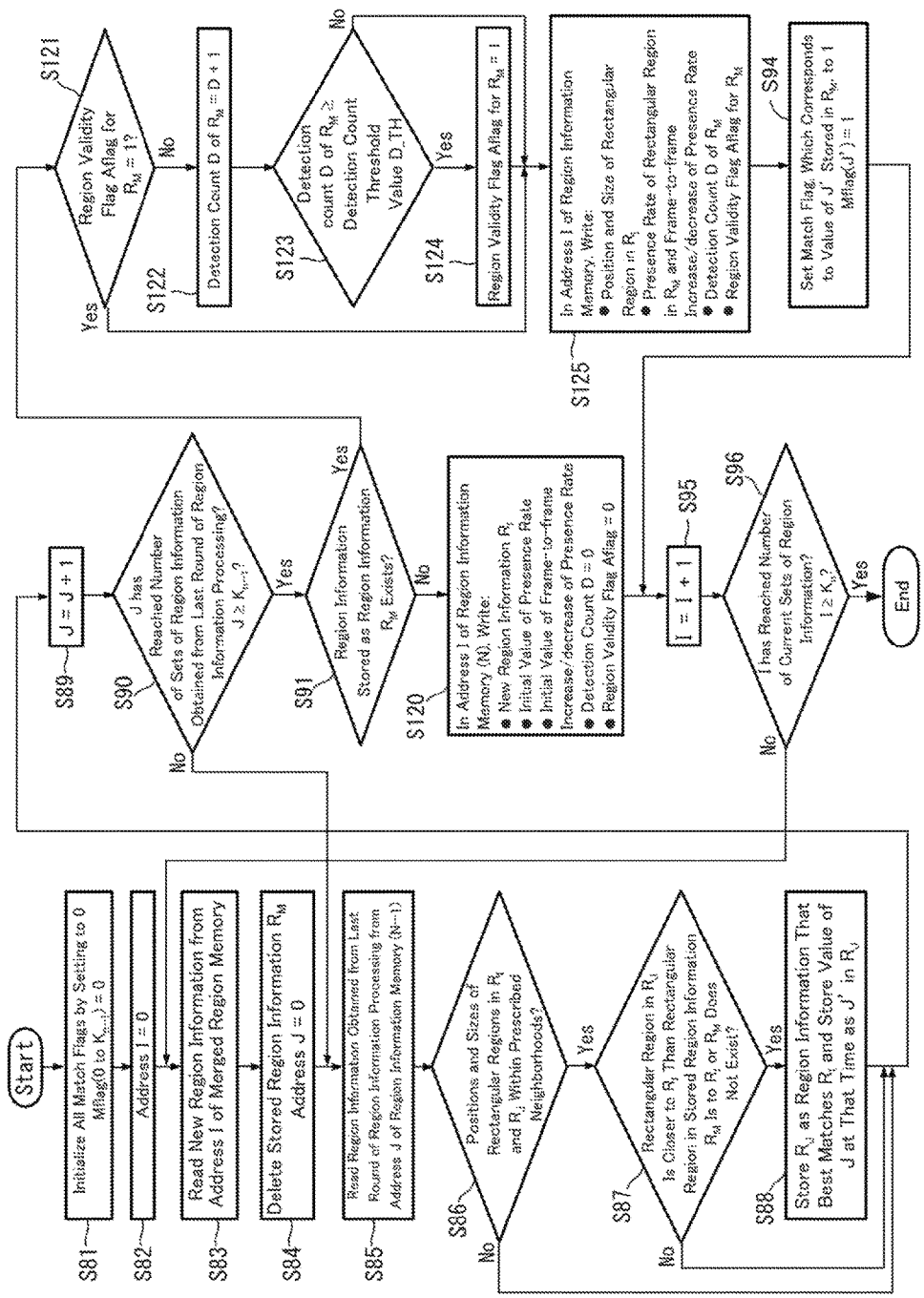
FIG. 12 is a flow chart depicting specific details of process 2 performed in step S62 shown in FIG. 6 by the video processing device in accordance with the third embodiment.

FIG. 12 is a flow chart depicting specific details of process 2 performed in step S62 shown in FIG. 6 by the video processing device in accordance with the third embodiment. Those processes in the flow chart shown in FIG. 12 that are the same as in the flow chart shown in FIG. 8 will be denoted by the same reference signs, and their detailed description will not be repeated.

In step S91, the region information processing section 21 determines whether or not there exists region information that was stored as the region information $R_M$. The region information processing section 21 implements next step S120 upon determining that there does not exist region information that was stored as the region information $R_M$ and implements step S121 upon determining that there exists region information that was stored as the region information $R_M$.

In step S120, the region information processing section 21 writes the new region information $R_J$, the initial value of the presence rate E, the initial value of the frame-to-frame increase/decrease of presence rate $\Delta E$, the detection count D (D=0), and the region validity flag Aflag (Aflag =0) in the address I of the region information memory (N).

In contrast, in step S121, the region information processing section 21 determines whether or not the region validity flag Aflag for the region information $R_M$ is 1. The region information processing section 21 implements step S122 upon determining that the region validity flag Aflag for the region information $R_M$ is 0 and implements step S125 upon determining that the region validity flag Aflag for the region information $R_M$ is 1.

In step S122, the region information processing section 21 adds 1 to the detection count D of the region information $R_M$ (D=D+1).

In step S123, the region information processing section 21 determines whether or not the detection count D of the region information $R_M$ is greater than or equal to a predetermined detection count threshold value D_TH. The region information processing section 21 implements step S124 upon determining that the detection count D of the region information $R_M$ is greater than or equal to the predetermined detection count threshold value D_TH and skips step S124 and implements step S125 upon determining that the detection count D of the region information $R_M$ is less than the predetermined detection count threshold value D_TH.

In step S124, the region information processing section 21 sets the region valid flag Aflag for the region information $R_M$ to 1.

In step S125, the region information processing section 21 writes the position and size of the rectangular region in the region information $R_J$, the presence rate E of a rectangular region in the region information $R_M$, the frame-to-frame increase/decrease of presence rate ΔE, the detection count D of the region information $R_M$, and the region validity flag Aflag for the region information $R_M$ in the address I of the region information memory (N).

In other words, the region information processing section 21 counts how many times a rectangular region has been detected consecutively for the same face (detection count D) and when the detection count D becomes greater than or equal to the predetermined detection count threshold value D_TH, sets the region validity flag Aflag to 1.

Figure 13:
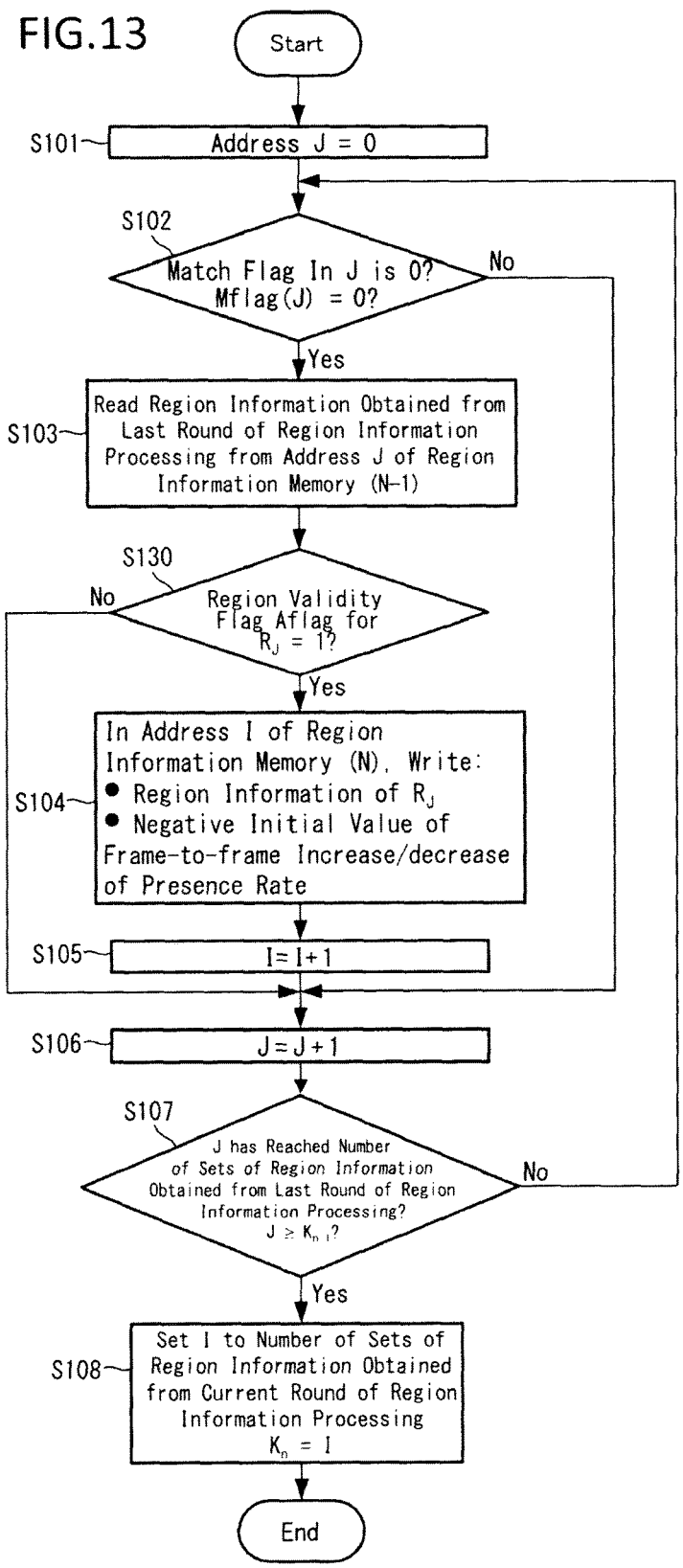
FIG. 13 is a flow chart depicting specific details of process 3 performed in step S63 shown in FIG. 6 by the video processing device in accordance with the third embodiment.

FIG. 13 is a flow chart depicting specific details of process 3 performed in step S63 shown in FIG. 6 by the video processing device in accordance with the third embodiment. Those processes in the flow chart shown in FIG. 13 that are the same as in the flow chart shown in FIG. 9 will be denoted by the same reference signs, and their detailed description will not be repeated.

In step S130 which ensues from step S103, the region information processing section 21 determines whether or not the region validity flag Aflag for the region information $R_J$ is 1. The region information processing section 21 implements step S104 upon determining that the region validity flag Aflag for the region information $R_J$ is 1 and skips steps S104 to S105 and implements step S106 upon determining that the region validity flag Aflag for the region information $R_J$ is 0.

In other words, it is determined whether or not the region validity flag Aflag is 1 for the part, of the region information obtained as a result of the last round of region information processing, that does not match the new region information in process 2. If the region validity flag Aflag is 0, no data is written to the region information memory (N). This technique deletes the region information for which the region validity flag Aflag is 0.

The following description will summarize the processes performed by the video processing device in accordance with the present embodiment. First, how many times a rectangular region has been detected consecutively for the same face is counted as the detection count D. If the detection count D is greater than or equal to the predetermined detection count threshold value D_TH, the region validity flag Aflag is set to 1. If the detection count D is less than the predetermined detection count threshold value D_TH, the region validity flag Aflag is set to 0. Then, after the presence rate E and the processing strength S are updated for the rectangular region for which the region validity flag Aflag is set to 1, the specific image processing is performed. On the other hand, for the region for which the region validity flag Aflag is set to 0, the presence rate E and the processing strength S are not updated. According to this technique, when a rectangular region is wrongly detected as a face region, the presence rate E and processing strength S for the region are retained at 0 if the number of wrong detections is less than the detection count threshold value D_th. Therefore, the region is not subjected to the specific image processing.

Figure 14:
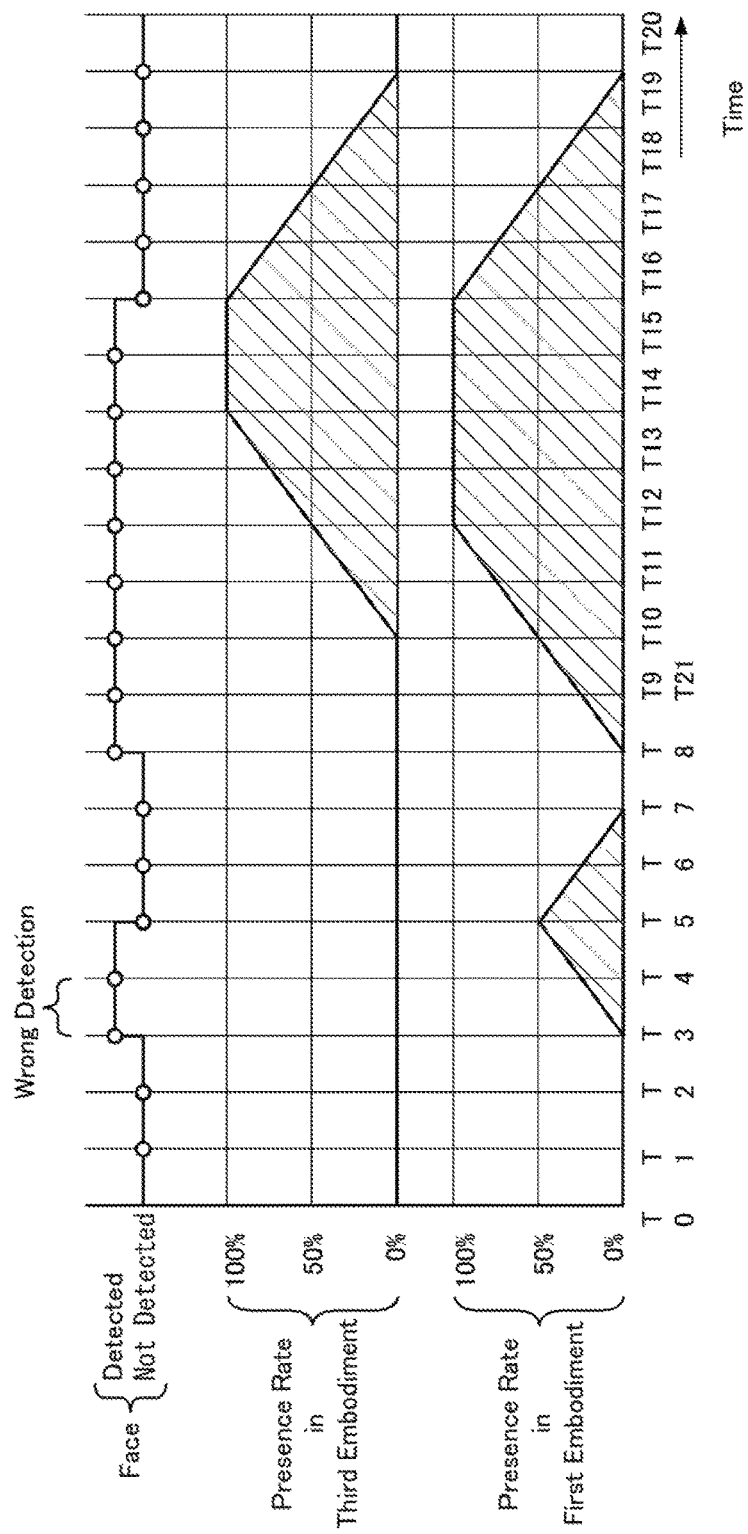
FIG. 14 is a diagram for comparison of the result of a process performed by the video processing device in accordance with the third embodiment and the result of a process performed by the video processing device in accordance with the first embodiment.

FIG. 14 is a diagram for comparison of the result of a process performed by the video processing device in accordance with the third embodiment and the result of a process performed by the video processing device in accordance with the first embodiment. FIG. 14 represents how the presence rate E changes when there is a change in the result of the face region detection in the same region of frames of a video. In this example, the presence rate E has an initial value of 0 (%) and a maximum value of 100 (%), the frame-to-frame increase/decrease of presence rate ΔE is 25 (%), and the predetermined detection count threshold value D_TH is 3.

In FIG. 14, a face region is detected at times T3 to T4 and T8 to T15. At times T3 to T4, however, a rectangular region that is actually not a face region is wrongly detected as a face region.

First, the results of processes performed by the video processing device in accordance with the first embodiment will be described. In the video processing device in accordance with the first embodiment, a region is detected as a face region at time T3, and the presence rate E is increased to 25 (%) at next time T4. The region is detected again as a face region at time T4, and the presence rate E is increased to 50 (%) at next time T5.

Thereafter, the region is no longer detected as a face region at time T5, and the presence rate E is decreased to 25 (%) at next time T6. The region is not detected again as a face region at time T6, and the presence rate E reaches 0 (%) at next time T7.

The region is detected as a face region at times T8 to T15, and the presence rate E is increased gradually starting at time T9 to reach a maximum value of 100 (%) at tithe T12. The region is no longer detected as a face region at and after time T16, and the presence rate E is decreased by a small amount at a time starting at time T17 to reach 0 (%) at time T20.

Next will be described the results of processes performed by the video processing device in accordance with the third embodiment. In the video processing device in accordance with the third embodiment, a region is detected as a face region at times T3 and T4. The presence rate E however remains at 0 (%) because the detection count D is less than the predetermined detection count threshold value D_TH (=3).

The region is detected as a face region at times T8 to T15, and the detection count D becomes greater than or equal to the predetermined detection count threshold value D_TH (=3) at time T10. Accordingly, the presence rate E is increased starting at next time T11 to reach a maximum value of 100 (%) at time T14. Thereafter, the region is no longer detected as a face region at and after time T16, and the presence rate E is decreased by a small amount at a time starting at time T17 to 0 (%) at time T20.

In other words, according to the video processing device in accordance with the third embodiment, a regions is wrongly detected as a face region at times T3 and T4, but the presence rate E remains at 0 because the detection count D is less than the predetermined detection count threshold value D_TH. Therefore, the region wrongly detected as a face region is not subjected to the specific image processing. Therefore, the image quality of the region is better in this case than it is in the case of the video processing device in accordance with the first embodiment.

Meanwhile, if the region is correctly detected as a face region at times T8 to T15, the video processing device in accordance with the first embodiment starts increasing the presence rate E and hence performing the specific image processing on the face region immediately at time T9. In contrast, the video processing device in accordance with the third embodiment, under the same conditions, starts performing the specific image processing on the face region slightly later than that because the video processing device in accordance with the third embodiment starts increasing the presence rate E after time T10 when the detection count D becomes greater than or equal to the predetermined detection count threshold value D_TH (=3).

Therefore, the video processing device in accordance with the third embodiment starts performing the specific image processing with a slight delay if a face region is accurately recognized, but is capable of completely eliminating any influence of wrong detection when the detection count D is less than the predetermined detection count threshold value D_TH.

The present invention is by no means limited to the embodiments described above. For example, the technical features disclosed in the embodiments may be combined where appropriate.

The video processing devices described in the embodiments above may be used in various video display devices including televisions, smart phones, tablet-type terminals, and game machines.

REFERENCE SIGNS LIST

1 Face Detection Unit (Characteristic Region Detection Unit, Determination Unit)
2 Region Information Unit (Processing Strength Specification Unit, Detection Counting Unit)
3 Image Processing Unit (Image Processing Unit)
4 Mixing Unit (Image Processing Unit, Processing Strength Specification Unit)
11 Pattern Determination Section
21 Region information Processing Section
41 Processing Strength Generation Section
42 Image Generation Section

The invention claimed is:

1. A video processing device comprising:
a characteristic region detection circuit to detect, as a characteristic region, a region having a prescribed characteristic in each frame of a video;
an image processing circuit to perform specific image processing on either the characteristic region in the frame or a region other than the characteristic region in the frame; and
a processing strength specification circuit to specify a processing strength with which the specific image processing is performed, the processing strength specification circuit altering the processing strength stepwise in at least three values that involve an intermediate value between a minimum value and a maximum value when there is a change in whether or not the characteristic region detection circuit has detected the characteristic region.

2. The video processing device according to claim 1, further comprising a determination circuit to determine a probability of the characteristic region having the prescribed characteristic, wherein the processing strength specification circuit specifies the processing strength in accordance with the probability of the characteristic region having the prescribed characteristic.

3. The video processing device according to claim 2, wherein the processing strength specification circuit increases the maximum value of the processing strength with an increase in the probability of the characteristic region having the prescribed characteristic.

4. The video processing device according to claim 3, wherein the processing strength specification circuit, in altering the processing strength stepwise, increases an initial value with an increase in the probability of the characteristic region having the prescribed characteristic.

5. The video processing device according to claim 4, wherein the processing strength specification circuit alters the processing strength stepwise by a per-step amount that increases with an increase in the probability of the characteristic region having the prescribed characteristic.

6. The video processing device according to claim 5, further comprising a detection counting circuit to count a number of times that the characteristic region detection circuit consecutively detects an identical characteristic region, wherein the processing strength specification circuit does not change the processing strength if the number of times that the identical characteristic region is consecutively detected is less than a predetermined value.

7. The video processing device according to claim 4, further comprising a detection counting circuit to count a number of times that the characteristic region detection circuit consecutively detects an identical characteristic region, wherein the processing strength specification circuit does not change the processing strength if the number of times that the identical characteristic region is consecutively detected is less than a predetermined value.

8. The video processing device according to claim 3, wherein the processing strength specification circuit alters the processing strength stepwise by a per-step amount that increases with an increase in the probability of the characteristic region having the prescribed characteristic.

9. The video processing device according to claim 8, further comprising a detection counting circuit to count a number of times that the characteristic region detection circuit consecutively detects an identical characteristic region, wherein the processing strength specification circuit does not change the processing strength if the number of times that the identical characteristic region is consecutively detected is less than a predetermined value.

10. The video processing device according to claim 3, further comprising a detection counting circuit to count a number of times that the characteristic region detection circuit consecutively detects an identical characteristic region, wherein the processing strength specification circuit does not change the processing strength if the number of times that the identical characteristic region is consecutively detected is less than a predetermined value.

11. The video processing device according to claim 2, wherein the processing strength specification circuit, in altering the processing strength stepwise, increases an initial value with an increase in the probability of the characteristic region having the prescribed characteristic.

12. The video processing device according to claim 11, wherein the processing strength specification circuit alters the processing strength stepwise by a per-step amount that increases with an increase in the probability of the characteristic region having the prescribed characteristic.

13. The video processing device according to claim 12, further comprising a detection counting circuit to count a number of times that the characteristic region detection circuit consecutively detects an identical characteristic region, wherein the processing strength specification circuit does not change the processing strength if the number of times that the identical characteristic region is consecutively detected is less than a predetermined value.

14. The video processing device according to claim 11, further comprising a detection counting circuit to count a number of times that the characteristic region detection circuit consecutively detects an identical characteristic region, wherein the processing strength specification circuit does not change the processing strength if the number of times that the identical characteristic region is consecutively detected is less than a predetermined value.

15. The video processing device according to claim 2, wherein the processing strength specification circuit alters the processing strength stepwise by a per-step amount that increases with an increase in the probability of the characteristic region having the prescribed characteristic.

16. The video processing device according to claim 15, further comprising a detection counting circuit to count a number of times that the characteristic region detection circuit consecutively detects an identical characteristic region, wherein the processing strength specification circuit does not change the processing strength if the number of times that the identical characteristic region is consecutively detected is less than a predetermined value.

17. The video processing device according to claim 2, further comprising a detection counting circuit to count a number of times that the characteristic region detection circuit consecutively detects an identical characteristic region, wherein the processing strength specification circuit does not change the processing strength if the number of times that the identical characteristic region is consecutively detected is less than a predetermined value.

18. The video processing device according to claim 1, further comprising a detection counting circuit to count a number of times that the characteristic region detection circuit consecutively detects an identical characteristic region, wherein the processing strength specification circuit does not change the processing strength if the number of times that the identical characteristic region is consecutively detected is less than a predetermined value.

19. The video processing device according to claim 1, wherein when the characteristic region detection circuit has newly detected the characteristic region, the processing strength specification circuit increases or decreases stepwise the processing strength for the newly detected characteristic region.

20. The video processing device according to claim 1, wherein when the characteristic region detection circuit no longer detects the characteristic region that has been detected, the processing strength specification circuit decreases or increases stepwise the processing strength for the characteristic region that is no longer detected.

* * * * *